(12) United States Patent
Sano

(10) Patent No.: US 11,865,442 B2
(45) Date of Patent: *Jan. 9, 2024

(54) APPARATUS, METHOD FOR CONTROLLING APPARATUS, AND COMPUTER-READABLE RECORDING MEDIUM

(71) Applicant: GREE, INC., Tokyo (JP)

(72) Inventor: Takayuki Sano, Minato-ku (JP)

(73) Assignee: GREE, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/590,691

(22) Filed: Feb. 1, 2022

(65) Prior Publication Data

US 2022/0152488 A1 May 19, 2022

Related U.S. Application Data

(63) Continuation of application No. 16/736,722, filed on Jan. 7, 2020, now Pat. No. 11,253,779, which is a (Continued)

(30) Foreign Application Priority Data

Apr. 30, 2013 (JP) .................................. 2013-095237

(51) Int. Cl.
*A63F 13/35* (2014.01)
*A63F 13/79* (2014.01)
(Continued)

(52) U.S. Cl.
CPC .............. *A63F 13/35* (2014.09); *A63F 13/25* (2014.09); *A63F 13/332* (2014.09);
(Continued)

(58) Field of Classification Search
CPC ...... A63F 13/25; A63F 13/332; A63F 13/335; A63F 13/35; A63F 13/79; A63F 2300/407; A63F 2300/552
See application file for complete search history.

(56) References Cited

U.S. PATENT DOCUMENTS

| | | |
|---|---|---|
| 6,533,273 B2 | 3/2003 | Cole et al. |
| 7,059,965 B2 | 6/2006 | Jackson |
| | (Continued) | |

FOREIGN PATENT DOCUMENTS

| | | |
|---|---|---|
| JP | 6-186059 A | 7/1994 |
| JP | 2002-526824 A | 8/2002 |
| | (Continued) | |

OTHER PUBLICATIONS

Tsubasa Yamamoto. A Report of Operation Check of Clash Royale, submitted Nov. 2, 2017 in Case No. H29 YO 22049 of JP Patent No. 6034532, 4 pages.

(Continued)

*Primary Examiner* — Seng H Lim
(74) *Attorney, Agent, or Firm* — Oblon, McClelland, Maier & Neustadt, L.L.P.

(57) ABSTRACT

Provided is a server device, etc., capable of enhancing flexibility of a reward winning game and maintaining a user's interest in the game. The server device manages rewards to be given to a user, and includes a storage unit for storing a package as a set of data concerning rewards to be given to the user and a modified package as a set of data concerning rewards used to update the package, a communication unit for communicating with a user device of the user, and a package updating unit for updating the package by modifying the data concerning the rewards included in the package by using the data concerning the rewards (Continued)

included in the modified package when a package update request is received from the user device.

20 Claims, 10 Drawing Sheets

Related U.S. Application Data continuation of application No. 15/298,755, filed on Oct. 20, 2016, now Pat. No. 10,549,187, which is a continuation of application No. 14/261,247, filed on Apr. 24, 2014, now Pat. No. 9,498,723.

(51) Int. Cl.
   *A63F 13/25* (2014.01)
   *A63F 13/332* (2014.01)
   *A63F 13/335* (2014.01)

(52) U.S. Cl.
   CPC ............ *A63F 13/335* (2014.09); *A63F 13/79* (2014.09); *A63F 2300/407* (2013.01); *A63F 2300/552* (2013.01)

(56) References Cited

U.S. PATENT DOCUMENTS

| | | | |
|---|---|---|---|
| 7,435,171 | B2 | 10/2008 | Hanafusa |
| 7,547,252 | B2 | 6/2009 | Peterson et al. |
| 7,682,245 | B2 | 3/2010 | Nguyen |
| 8,075,389 | B1 | 12/2011 | Schultz et al. |
| 8,684,835 | B2 | 4/2014 | Nonaka et al. |
| 8,858,340 | B2 | 10/2014 | Kobayashi |
| 9,498,723 | B2 | 11/2016 | Sano |
| 10,549,187 | B2 | 2/2020 | Sano |
| 10,607,435 | B2 | 3/2020 | Lutnick et al. |
| 2004/0133485 | A1 | 7/2004 | Schoonmaker et al. |
| 2006/0183550 | A1 | 8/2006 | Gagner et al. |
| 2007/0060321 | A1 | 3/2007 | Vasquez et al. |
| 2007/0117606 | A1 | 5/2007 | Baerlocher et al. |
| 2007/0287532 | A1 | 12/2007 | Jackson |
| 2008/0039166 | A1 | 2/2008 | Harris et al. |
| 2009/0036202 | A1 | 2/2009 | Baerlocher et al. |
| 2009/0118022 | A1 | 5/2009 | Lyons et al. |
| 2009/0124350 | A1 | 5/2009 | Iddings et al. |
| 2009/0137312 | A1 | 5/2009 | Walker et al. |
| 2009/0227364 | A1 | 9/2009 | Kelly et al. |
| 2009/0291736 | A1 | 11/2009 | Walker et al. |
| 2009/0305778 | A1 | 12/2009 | Yu |
| 2010/0203963 | A1 | 8/2010 | Allen |
| 2013/0004932 | A1 | 1/2013 | Mahajan |
| 2013/0005466 | A1 | 1/2013 | Mahajan |
| 2013/0005475 | A1 | 1/2013 | Mahajan |
| 2013/0005480 | A1 | 1/2013 | Bethke |
| 2013/0006735 | A1 | 1/2013 | Koenigsberg |
| 2013/0006736 | A1 | 1/2013 | Bethke |
| 2013/0060641 | A1* | 3/2013 | Al Gharabally ....... G06Q 30/02 705/14.66 |
| 2013/0079116 | A1 | 3/2013 | Nelson et al. |
| 2013/0222116 | A1 | 8/2013 | Barry, III |
| 2013/0288757 | A1 | 10/2013 | Guthridge et al. |
| 2014/0004937 | A1 | 1/2014 | Inagawa et al. |
| 2014/0031129 | A1 | 1/2014 | Morrison |
| 2014/0053175 | A1 | 2/2014 | Ito |
| 2019/0329137 | A1 | 10/2019 | Caldarone et al. |

FOREIGN PATENT DOCUMENTS

| | | | |
|---|---|---|---|
| JP | 2002-346235 | A | 12/2002 |
| JP | 2004-174090 | A | 6/2004 |
| JP | 2008-12221 | A | 1/2008 |
| JP | 2012-210398 | A | 11/2012 |
| JP | 2012-221132 | A | 11/2012 |
| JP | 2013-070970 | | 4/2013 |
| JP | 2014-12051 | A | 1/2014 |
| JP | 5409876 | B1 | 2/2014 |
| JP | 6280093 | B2 | 2/2018 |
| KR | 10-2013-0039894 | A | 4/2013 |
| WO | WO 2013/111391 | A1 | 8/2013 |

OTHER PUBLICATIONS

Supercell's First Brief, submitted Aug. 29, 2017 in Case No. H29 YO 22049 of JP Patent No. 6034532, 36 pages.
Supercell's Second Brief, submitted Nov. 2, 2017 in Case No. H29 YO 22049 of JP Patent No. 6034532, 43 pages.
Gree's Second Brief, submitted Nov. 28, 2017 in Case No. H29 YO 22049 of JP Patent No. 6034532, 16 pages.
Supercell's Third Brief, submitted Jan. 11, 2018 in Case No. H29 YO 22049 of JP Patent No. 6034532, 29 pages.
Gree's Third Brief, submitted Feb. 20, 2018 in Case No. H29 YO 22049 of JP Patent No. 6034532, 24 pages.
Supercell's Sixth Brief, submitted Mar. 20, 2018 in Case No. H29 YO 22049 of JP Patent No. 6034532, 22 pages.
Gree's Fourth Brief, submitted May 17, 2018 in Case No. H29 YO 22049 of JP Patent No. 6034532, 21 pages.
"Orions 2 Hints and Tips", retrieved from the internet http://iphoneac.com/orions2.html, Moregames Entertainment, 2010, 13 Pages.
"Lux Touch Lux DLX Hints and Tips", retrieved from the internet http://iphoneac.com/lux.html, Sillysoft Games, 2008, 13 Pages.
"Dominion atwiki", retrieved from the internet https://www23.atwiki.ip/peer-takuge/pages/16.html on Jan. 4, 2018, 3 Pages.
"The arrival of Pokemon Card Game Collection Pack", retrieved form the internet http://tocage.ip/pages/1239967985.html, Duel Portal, 2009, 3 Pages.
"ECO Changes Greatly Depending on Tune-Up and Introduction of the New System", retrieved from the internet http://www.4Gamer.net/games/020/G002066/20090527006/, May 27, 2009, 13 Pages.
"Popgun MiraleSummonerCui", retrieved from the internet http://popgun.joyfulroad.moo.jp/?eid=460227, Jan. 1, 2007, 3 Pages.
"Soliloquies of Koby", retrieved from the internet http://blog.livedoor.jp/koby_akid/archives/5187161.html, Jul. 17, 2010, 2 Pages.
Office action dated Jul. 8, 2014 for corresponding Japanese Application No. 2013-095237, partial English translation, 18pp.
"Gandam Card Collection, Cost of Gacha is substantially disclosed", Internet <URL: http://www.gamecast-blog.com/archives/65683438.html>, Published Jun. 10, 2021, cited in Office action above, including relevance, 8pp.
"Yu-Gi-Oh! Power of Chaos: Joey the Passion—FAQ-PC—By crispymallow—Game FAQs", SUPERCELL_PA_00012617-, Jun. 29, 2020, pp. 1-69, https://gamefaqs.gamespot.com/pc/920746-yu-gi-oh-power-of-chaos-joey-the-passion/faqs/30509.
"Madara", SUPERCELL_PA_00012399-00. Jul. 30, 2020, 2 pages, https://pockieninjasocial.fandom.com/wiki/Madara.
"Yu-Gi-Oh! Power of Chaos: Joey the Passion", SUPERCELL_PA_00012118-23, Jul. 30, 2020, 6 pages, https://yugioh.fandom.com/wiki/Yu-Gi-Ohl_Power_of_Chaos:_Joey_the_Passion.
"Yu-Gi-Oh! Power of Chaos: Joey the Passion",SUPERCELL_PA_00012067-71, Jul. 30, 2020, 5 pages, Yu-Gi-Oh! Power of Chaos: Joey the Passion (Game)—Giant Bomb, hrtps://web.archive.org/web20200731025528/https://www.giantbomb.c . . . .
"Yu-Gi-Oh! Power of Chaos: Joey the Passion Cheats", SUPERCELL_PA_00012700-01, Neoseeker: Games : PC : PC : Strategy : Turn-based : Yu-Gi-Oh! Power of Chaos: Joey the Passion : Cheats, Jun. 28, 2014, 2 pages.
"Yu-Gi-Oh! Power of Chaos: Joey the Passion", SUPERCELL_PA_00012691-99, Yu-Gi-Oh! Power of Chaos: Joey the Passion (Game)—Giant Bomb, Jun. 29, 2020, 9 pages https://www.giantbomb.com/yu-gi-oh-power-of-chaos-joey-the-passion/3030-3483/.
"Yu-Gi-Oh! Power of Chaos—Joey the Passion Cheats", SUPERCELL_PA_00012689-90, Jun. 29, 2020, 2 pages https://web.archive.org/web/20090409165539/http://www.cheatinfo.de/files/yuguonlpoerofjoey.him.
Exhibit A-1—Preliminary Invalidity Contentions—U.S. Pat. No. 10,549,187 to Sano Based on U.S. Patent App. Pub. No. 2007/0117606 to Baerlocher et al. ("Baerlocher"), cites in OA/Court Case, Sep. 21, 2020, pp. 1-21.

(56) References Cited

OTHER PUBLICATIONS

Exhibit A-2—Preliminary Invalidity Contentions—U.S. Pat. No. 10,549,187 to Sano Based on a Machine Translation of Korean Patent App. Pub. No. KR20130039894A to Bin et al. ("Bin (MachineTranslation)"), cited in OA/Court Case, Sep. 21, 2020, pp. 1-16.
Exhibit A-3—Preliminary Invalidity Contentions—U.S. Pat. No. 10,549,187 to Sano Based on U.S. Patent App. Pub. No. 20190329137 to Caldarone et al. ("Caldarone"), cited in OA/Court Case, Sep. 21, 2020, pp. 1-33.
Exhibit A-4—Preliminary Invalidity Contentions—U.S. Pat. No. 10,549,187 to Sano Based on U.S. Patent App. Pub. No. 2013/0288757 to Guthridge et al. ("Guthridge"), cited in OA/Court Case, Sep. 21, 2020, pp. 1-24.
Exhibit A-5—Preliminary Invalidity Contentions—U.S. Pat. No. 10,549,187 to Sano Based on U.S. Pat. No. 7,435,171 to Hanafusa ("Hanafusa"), cited in OA/Court Case, Sep. 21, 2020, pp. 1-16.
Exhibit A-6—Preliminary Invalidity Contentions—U.S. Pat. No. 10,549,187 to Sano Based on U.S. Patent App. Pub. No. 2008/0039166 to Harris et al. ("Harris"), cited in OA/Court Case, Sep. 21, 2020, pp. 1-18.
Exhibit A-7—Preliminary Invalidity Contentions—U.S. Pat. No. 10,549,187 to Sano Based on U.S. Patent App. Pub. No. 2014/0004937 to Inagawa et al. ("Inagawa"), cited in OA/Court Case, Sep. 21, 2020, pp. 1-21.
Exhibit A-8—Preliminary Invalidity Contentions—U.S. Pat. No. 10,549,187 to Sano Based on PCT Patent App. Pub. No. WO2013111391A1 to Nobuya et al. ("Nobuya"), cited in OA/Court Case, Sep. 21, 2020, pp. 1-21.
Exhibit A-9—Preliminary Invalidity Contentions—U.S. Pat. No. 10,549,187 to Sano Based on U.S. Pat. No. 7,547,252 to Peterson et al. ("Peterson"), cited in OA/Court Case, Sep. 21, 2020, pp. 1-22.
Exhibit A-10—Preliminary Invalidity Contentions—U.S. Pat. No. 10,549,187 to Sano Based on Pockie Ninja 2 Social, by NGames Limited ("Pockie Ninja"), cited in OA/Court Case, Sep. 21, 2020, pp. 1-19.
Exhibit A-11—Preliminary Invalidity Contentions—U.S. Pat. No. 10,549,187 to Sano Based on Yu-Gi-Oh! Power of Chaos: Joey the Passion, by Konami Digital Entertainment Co., Ltd. ("Yu-Gi-Oh"), cited in OA/Court Case, Sep. 21, 2020, pp. 1-22.
Defendant Supercell Oy's Invalidity Contentions and Disclosures Under Local Patent Rules 3-3 and 3-4, Letter, Sep. 21, 2020, 27 pages.
Preliminary Ineligibility Contentions—U.S. Pat. No. 10,549,187 to Sano, Letter, Sep. 21, 2020, 49 pages.
Defendant Supercell Oy's Preliminary Ineligibility Contentions Ex. A, Letter, Sep. 21, 2020, 5 pages.
Kenrick Mock et al., "Cyberspace Game Show Hosts : Agents for Socialization, Not Just Entertainment", Supercell PA 00012949, From: AAAI Technical Report WS-96-03,1996, AAAI (www.aaai.org), pp. 12-16.
Justin Matejka et al., "IP-QAT: In-Product Questions, Answers & Tips", Paper Session: With a Little Help, UIST'11, Oct. 16-19, 2011, Supercell PA 00012953, pp. 175-184.
Japanese Office Action dated Jun. 8, 2020 in Patent Application No. 2019-111530 (with English translation), 12 pages.
Japanese Office Action dated Mar. 11, 2020 in Patent Application No. 2018-167254 (with English translation), 9 pages.
Japanese Office Action dated May 12, 2020 in Patent Application No. 2019-072333 (with English translation), 6 pages.
Japanese Office Action dated Apr. 3, 2020 in Patent Application No. 2019-036527 (with English translation), 6 pages.
Japanese Office Action dated May 26, 2020 in Patent Application No. 2015-181882 (with English translation), 6 pages.
Japanese Office Action dated Sep. 3, 2019 in Patent Application No. 2018-167254 (with English translation), 8 pages.
Petition for Post-Grant Review dated Nov. 3, 2020 in U.S. Pat. No. 10,549,187, 94 pages.
Exhibit 1002—File history of U.S. Pat. No. 10,549,187, 406 pages.

Exhibit 1004—File history of U.S. Pat. No. 9,498,723 B2, 251 pages.
Exhibit 1005—Declaration of Stacy Friedman in Support of Petition for Post-Grant Review issued Nov. 3, 2020 in U.S. Pat. No. 10,549,187, 100 pages.
Exhibit 1006—Curriculum Vitae of Stacy Friedman, 6 pages.
Exhibit 1011—"Microsoft Computer Dictionary," Microsoft Press, Fourth Edition, 1999, 3 pages.
Exhibit 1012—"Gashapon," Wikipedia, Retrieved from the Internet [URL: https://web.archive.org/web/20120222202109/https://en.wikipedia.org/wiki/gashapon], Retrieved on Oct. 29, 2020, 4 pages.
Exhibit 1013—Dr. Serkan Toto, "Gacha: Explaining Japan's Top Money-Making Social Game Mechanism [Social Games]," Retrieved from the Internet [URL: https://web.archive.org/web/20120226042720/http://www.serkantoto.com/2012/02/21/gacha-social-games/], Feb. 21, 2012, 2 pages.
Exhibit 1014—Dr. Serkan Toto, ""Kompu Gacha" Social Game Mechanic Is History, Here's How It All Went Down [Social Games]," Retrieved from the Internet [URL: https://web.archive.org/web/20120514022006/http://www.serkantoto.com/2012/05/09/kompu-gacha-dena-gree-history/], May 9, 2012, 3 pages.
Exhibit 1015—Dr. Serkan Toto, "Box Gacha: Gree and DeNA Found a Replacement for Kompu Gacha [Social Games]," Retrieved from the Internet [URL: https://web.archive.org/web/20121107134924/http://www.serkantoto.com:80/2012/11/01/kompu-gacha-package-box-gacha/], Nov. 1, 2012, 4 pages.
Exhibit 1016—Kevin A. Harrigan, et al., "Addictive Gameplay: What Casual Game Designers Can Learn from Slot Machine Research," FuturePlay @ Vancouver Digital Week 2010, May 2010, 8 pages.
Exhibit 1017—Gree, Inc.'s Disclosure of Asserted Claims and Infringement Contentions, Jul. 6, 2020, Case No. 2:20-cv-00113-JRG-RSP (E.D. Tex.),102 pages.
Exhibit 1018—Trademark registration for "Gashapon" from the USPTO Trademark Electronic Search System, Retrieved on Oct. 22, 2020, 2 pages.
Exhibit 1019—"Pull-tab," Wikipedia, Retrieved from the Internet [URL: https://web.archive.org/web/20121224031928/https://en.wikipedia.org/wiki/Pull-tab], Retrieved on Oct. 22, 2020, 3 pages.
*Gree, Inc.*, Plaintiff, v. *Supercell Oy*, Defendant. Civil Action No. 2:20-cv-00113-JRG-RSP, Jury Trial Demanded, "Expert Report of Stacy Friedman" Apr. 9, 2021, 198 pages.
*Gree, Inc.*, Plaintiff, v. *Supercell Oy*, Defendant. The Honorable Roy S. Payne, Case No. 2:20-cv-00113-JRG-RSP, Jury Trial Demanded, "Rebuttal Expert Report of Dr. Robert AKL, D.SC. Regarding Validity of U.S. Pat. Nos. 10,549,187, 10,610,771, and 10,625,149" Apr. 30, 2021, 258 pages.
*Gree, Inc.*, Plaintiff, v. *Supercell Oy*, Defendant. Civil Action No. 2:20-cv-00113-JRG-RSP, Jury Trial Demanded, "Expert Report of Dr. Robert AKL, D.SC. Regarding Infringement of U.S. Pat. Nos. 10,549,187, 10,610,771, and 10,625,149" Apr. 9, 2021, 180 pages.
Appendix A, Stacy A. Friedman, Summary, Apr. 6, 2021, 7 pages.
Appendix B. Expert Report of Stacy Friedman, *Gree, Inc.* v. *Supercell, Oy* No. 2:20-cv-00113-JRG-RSP, Apr. 9, 2021, 5 pages.
*Gree, Inc.*, Plaintiff, v. *Supercell Oy*. Defendant. Case No. 2:20-cv-113-JRG-RSP, Jury Trial Demanded, "Plaintiff Gree, Inc.'s Opposition to Defendant Supercell Oy's Motion for Summary Judgment of Invalidity for Failure to Claim Patent-Eligible Subject Matter Under 35 U.S.C. § 101" Jun. 1, 2021, 133 pages.
*Gree, Inc.*, Plaintiff, v. *Supercell Oy*, Defendant. Case No. 2:20-cv-00113-JRG-RSP, Jury Trial Demanded, "Supercell Oy's Opposition to Plaintiff's Motion to Strike Portions of the Expert Report of Stacy Friedman" Jun. 1, 2021, 188 pages.
*Gree, Inc.*, Plaintiff, v. *Supercell Oy*, Defendant. The Honorable Rodney Gilstrap, Civil Action No. 2:20-cv-00113-JRG-RSP, Jury Trial Demanded "Defendant Supercell Oy's Motion for Summary Judgment of Invalidity Under 35 U.S.C. § 101" Jun. 4, 2021, 116 pages.
*Gree, Inc.*, Plaintiff, v. *Supercell Oy*, Defendant. The Honorable Rodney Gilstrap, Civil Action No. 2:20-cv-00113-JRG-RSP, Jury Trial Demanded, "Defendant Supercell Oy's Reply in Support of Motion for Summary Judgment of Invalidity Under 35 U.S.C. § 101" Jun. 8, 2021, 16 pages.

(56) References Cited

OTHER PUBLICATIONS

*Gree, Inc.*, Plaintiff, v. *Supercell Oy*, Defendant. Case No. 2:20-cv-113-JRG-RSP, Jury Trial Demanded, "Plaintiff's Reply in Support of Motion to Strike Expert Testimony of Mr. Stacy Friedman Regarding Purported Prior Art" Jun. 9, 2021, 9 pages.

*Gree, Inc.*, Plaintiff, v. *Supercell Oy*, Defendant. Case No. 2:20-cv-113-JRG-RSP, Jury Trial Demanded, "Plaintiff Gree, Inc.'S Sur-Reply in Opposition to Defendant Supercell Oy's Motion for Summary Judgment of Invalidity for Failure to Claim Patent-Eligible Subject Matter Under 35 U.S.C. § 101" Jun. 15, 2021, 15 pages.

*Gree, Inc.*, Plaintiff, v. *Supercell Oy*, Defendant. The Honorable Rodney Gilstrap, Civil Action No. 2:20-cv-113-JRG-RSP, Jury Trial Demanded, "Supercell Oy's Sur-Reply to Plaintiff's Motion to Strike Portions of the Expert Report of Stacy Friedman" Jun. 16, 2021, 9 pages.

*Gree, Inc.*, Plaintiff, v. *Supercell Oy*, Defendant. The Honorable Rodney Gilstrap, Civil Action No. 2:20-cv-113-JRG-RSP, Jury Trial Demanded, "Supercell Oy's Opposition to Plaintiff's Motion to Strike the Declaration of Stacy Friedman and Related Documents [131]" Jun. 22, 2021, 14 pages.

*Gree, Inc.*, Plaintiff, v. *Supercell Oy*, Defendant. Case No. 2:20-cv-113-JRG-RSP, Jury Trial Demanded, "Plaintiff's Reply in Support of Motion to Strike Untimely and Unauthorized Expert Testimony of Mr. Stacy Friedman and Related Documents" Jun. 30, 2021, 9 pages.

*Gree, Inc.*, Plaintiff, v. *Supercell Oy*. Defendant. The Honorable Rodney Gilstrap, Civil Action No. 2:20-cv-113-JRG-RSP. Jury Trial Demanded, "Supercell Oy's Sur-Reply in Opposition to Plaintiff's Motion to Strike the Declaration of Stacy Friedman and Related Documents [131]" Jul. 7, 2021, 10 pages.

Patent Owner's Preliminary Response Pursuant to 37 C.F.R. § 42.207; *Supercell Oy*, Petitioner v. *Gree, Inc.*, Patent Owner; Case PGR2021-00009 U.S. Pat. No. 10,549,187; dated Feb. 24, 2021; 65 pages.

Petitioner's Reply to Patent Owner's Preliminary Response Pursuant to 37 C.F.R. § 42.108(c); *Supercell Oy*, Petitioner v. *Gree, Inc.*, Patent Owner; Case PGR2021-00009 U.S. Pat. No. 10,549,187 B2; dated Mar. 15, 2021; 11 pages.

Patent Owner's Sur-Reply to Petitioner's Reply to Patent Owner's Preliminary Response; *Supercell Oy*, Petitioner v. *Gree, Inc.*, Patent Owner; Case PGR2021-00009 U.S. Pat. No. 10,549,187; dated Mar. 29, 2021; 11 pages.

Decision Denying Institution of Post-Grant Review 35 U.S.C. § 324(a); *Supercell Oy*, Petitioner v. *Gree, Inc.*, Patent Owner; PGR2021-00009 U.S. Pat. No. 10,549,187 B2; dated May 10, 2021; 14 pages.

\* cited by examiner

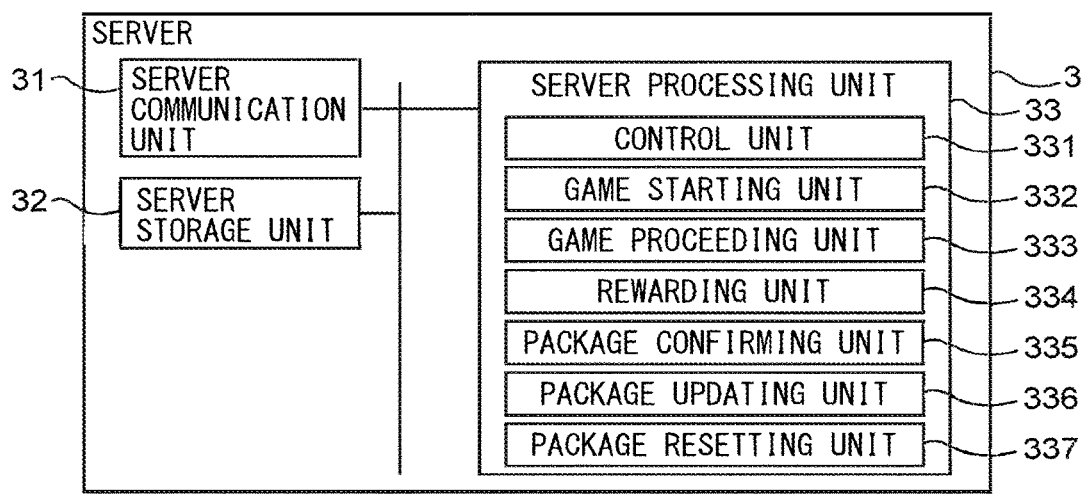

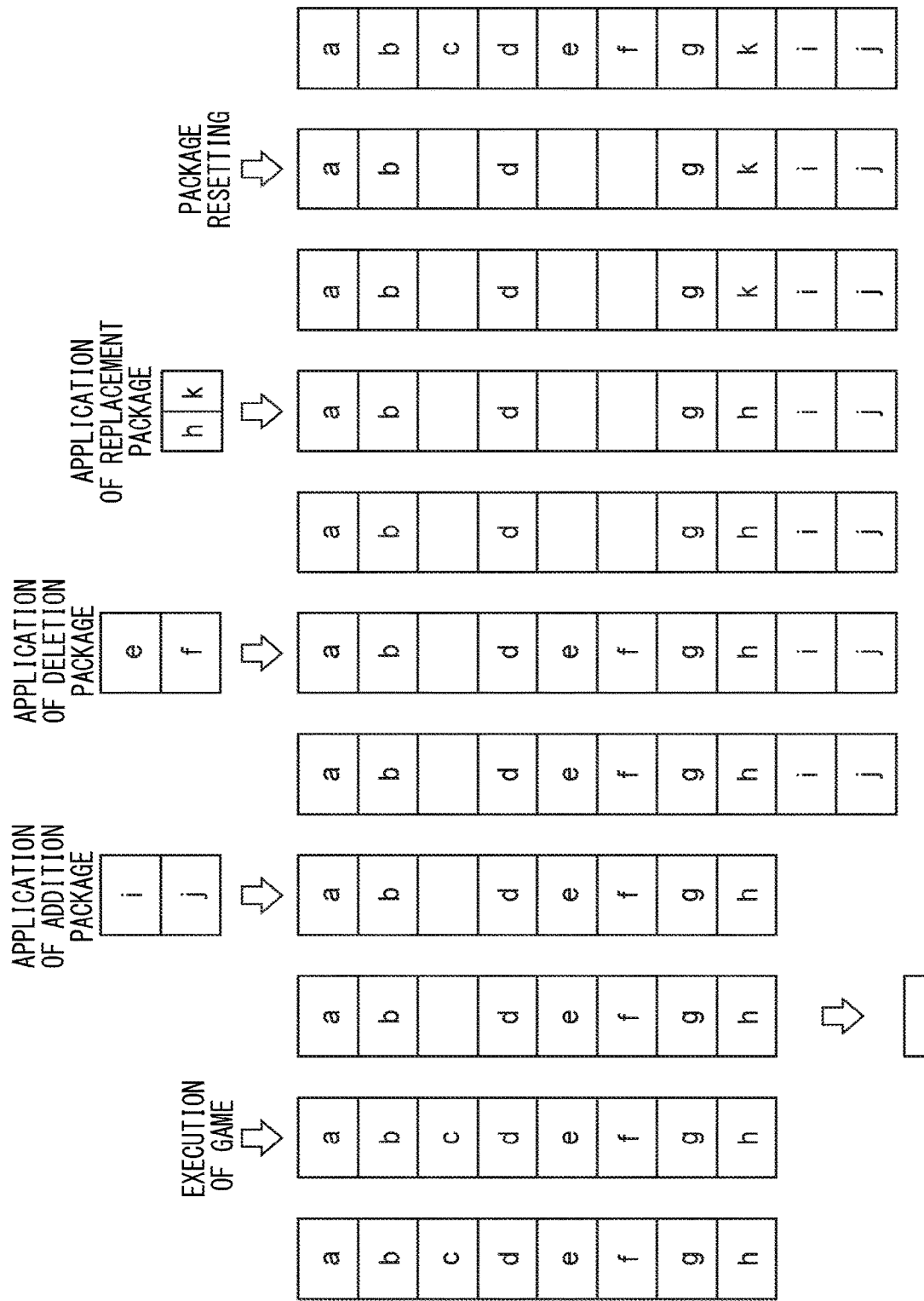

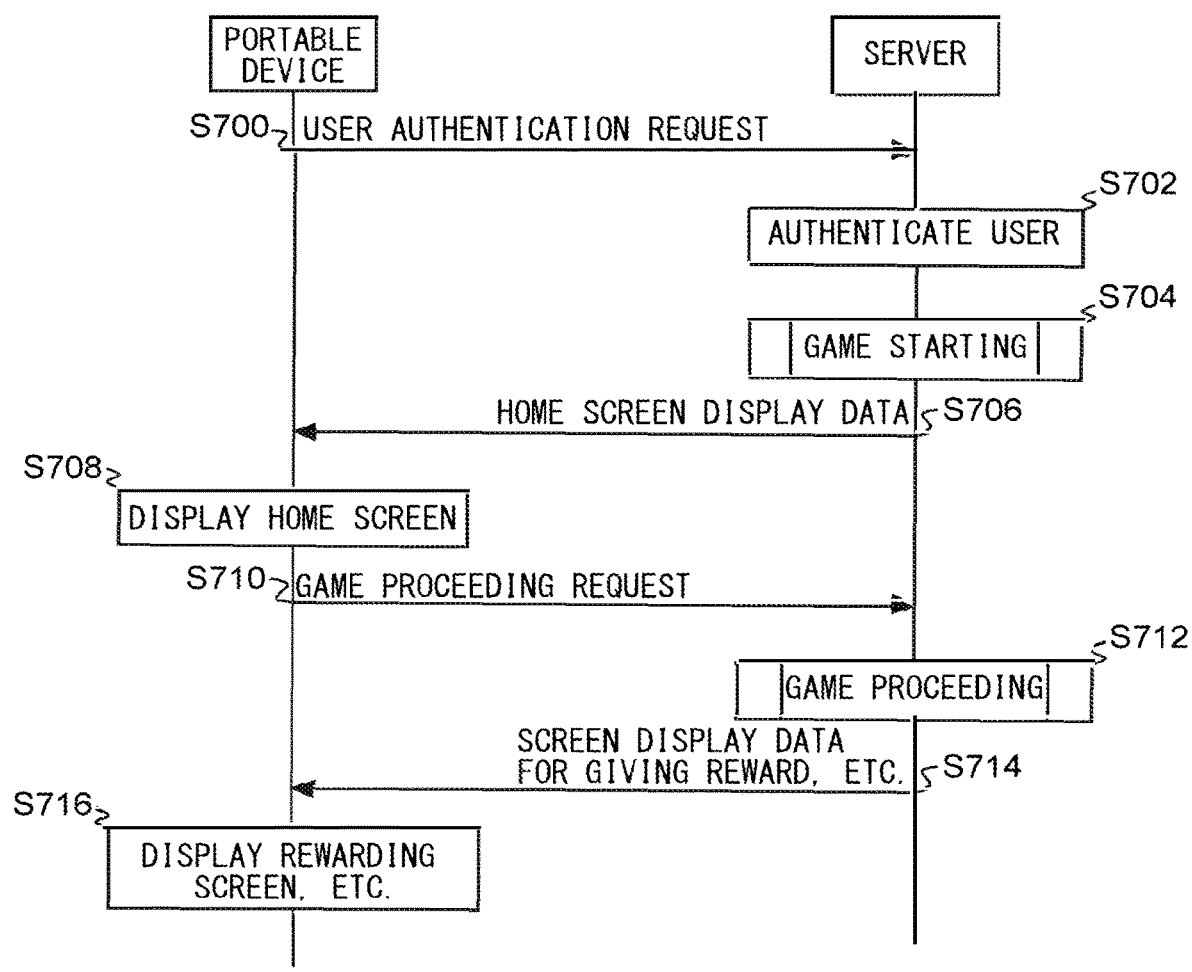

APPARATUS, METHOD FOR
CONTROLLING APPARATUS, AND
COMPUTER-READABLE RECORDING
MEDIUM

CROSS REFERENCE TO RELATED
APPLICATION

This application is a continuation application of U.S. patent application Ser. No. 16/736,722, filed Jan. 7, 2020, which is a continuation application of U.S. patent application Ser. No. 15/298,755, filed Oct. 20, 2016, now U.S. Pat. No. 10,549,187, issued Feb. 4. 2020 (the entire contents of each of which is incorporated herein by reference), which is continuation application of U.S. patent application Ser. No. 14/261,247, filed Apr. 24, 2014, now U.S. Pat. No. 9,498,723, issued Nov. 22, 2016, which claims benefit of JP 2013-095237, filed Apr. 30, 2013, the entire contents of which are hereby incorporated by reference.

TECHNICAL FIELD

This invention relates to a server device, a user device, a method for controlling a server device, a recording medium, and a system.

BACKGROUND

Servers that provide games to portable devices via communication networks have been widespread in recent years. Games provided by such servers include, for example, reward winning games (including those generally known as "Gachagacha (registered trademark in Japan)") (for example, refer to Japanese Unexamined Patent Publication No. 2012-221132). A reward winning game is a game in which a reward selected from a set of rewards by random lottery is given to a user.

Recently, a package-type reward winning game has been proposed in which a list showing the kinds of rewards and the number of rewards to be given is presented in advance to the user and rewards selected from the list are given to the user without duplication among the rewards. More specifically, in the package-type reward winning game, a package (a set or group) of rewards is made available for each user, and any reward once given to the user is deleted from the package so that the same reward will not be given to the user in a duplicate manner. The package-type reward winning game has the feature that no duplication occurs among the rewards won and that a user can eventually receive even rare rewards without fail.

SUMMARY

In the package-type reward winning game, a user is allowed to reset the package. The user is also allowed to replace the package with another package. However, in either case, the user has to try the reward winning game over again from the beginning. Accordingly, for example, if the user wants to regain any reward already won or wants to receive a reward not included in the package, the user cannot receive such rewards unless the user abandons all of the rewards so far won. In this way, the prior art reward winning game lacks flexibility and limits the user's activity. As a result, with the prior art reward winning game, it has been difficult to maintain the user's interest by providing a new package, etc., and there has therefore been the possibility that the user may soon become bored with the game.

The present invention has been devised to overcome the above prior art problem, and an object of the invention is to provide a server device, a user device, a method for controlling a server device, a recording medium, and a system capable of enhancing flexibility of a reward winning game and maintaining user's interest in the game.

Provided is a server device for managing rewards to be given to a user, including a storage unit for storing a package as a set of data concerning rewards to be given to the user and a modified package as a set of data concerning rewards used to update the package, a communication unit for communicating with a user device of the user, and a package updating unit for updating the package by modifying the data concerning the rewards included in the package by using the data concerning the rewards included in the modified package when a package update request is received from the user device.

Preferably, in the above server device, the package updating unit adds the data concerning the rewards included in the modified package to the package.

Preferably, in the above server device, the package updating unit deletes, from the package, data corresponding to the data concerning the rewards included in the modified package.

Preferably, in the above server device, the modified package includes first data as data corresponding to data concerning a reward to be replaced from the package and second data as data concerning a reward by which the reward to be replaced is replaced, and the package updating unit replaces, in the package, the data corresponding to the first data included in the modified package by the second data included in the modified package.

Preferably, in the above server device, the storage unit stores a plurality of modified packages, and the package updating unit updates the package by using the modified package selected by the user from among the plurality of modified packages.

Preferably, the above server device further includes a rewarding unit for selecting one of the data concerning the rewards included in the package when a reward request is received from the user device, and for giving the reward corresponding to data concerning the selected reward to the user, while at the same time, deleting the data concerning the selected reward from the package.

Preferably, the above server device further includes a package confirming unit for creating a list of rewards corresponding to the data concerning the rewards included in the package when a package confirmation request is received from the user device, and for transmitting the created list of rewards to the user device.

Preferably, the above server device further includes a package resetting unit for reinstating data concerning any reward previously deleted from the package to the package when a package resetting request is received from the user device.

Provided is a server device for managing rewards to be given to a user, including a means for storing a package as a set of data concerning rewards to be given to the user and a modified package as a set of data concerning rewards used to update the package, a means for communicating with a user device of the user, and a means for updating the package by modifying the data concerning the rewards included in the package by using the data concerning the rewards included in the modified package when a package update request is received from the user device.

A user device of a user capable of communicating with a server device for managing rewards to be given to the user is also provided. The server device includes a storage unit for storing a package as a set of data concerning rewards to be given to the user and a modified package as a set of data concerning rewards used to update the package. The user device includes a communication unit for transmitting a package update request to the server device, and for receiving information on an updated package which is generated by the server device modifying the data concerning the rewards included in the package by using the data concerning the rewards included in the modified package, and a processing unit for controlling the communication unit.

A method for controlling a server device for managing rewards to be given to a user also provided. The server device includes a storage unit for storing a package as a set of data concerning rewards to be given to the user and a modified package as a set of data concerning rewards used to update the package. The method includes the steps of receiving a package update request from a user device of the user, and updating the package by modifying the data concerning the rewards included in the package by using the data concerning the rewards included in the modified package.

A non-transitory computer-readable recording medium having recorded thereon a program for controlling a server device for managing rewards to be given to a user also provided. The server device includes a storage unit for storing a package as a set of data concerning rewards to be given to the user and a modified package as a set of data concerning rewards used to update the package. The program causes the server device to execute a process. The process including the steps of receiving a package update request from a user device of the user, and updating the package by modifying the data concerning the rewards included in the package by using the data concerning the rewards included in the modified package.

A non-transitory computer-readable recording medium having recorded thereon a program for controlling a user device of a user capable of communicating with a server device for managing rewards to be given to a user is also provided. The server device includes a storage unit for storing a package as a set of data concerning rewards to be given to the user and a modified package as a set of data concerning rewards used to update the package. The program causes the user device to execute a process. The process includes the steps of transmitting a package update request to the server device, and receiving information on an updated package which is generated by the server device modifying the data concerning the rewards included in the package by using the data concerning the rewards included in the modified package.

A system including a server device for managing rewards to be given to a user, and a user device of the user is also provided. The server device includes a storage unit for storing a package as a set of data concerning rewards to be given to the user and a modified package as a set of data concerning rewards used to update the package, a communication unit for communicating with the user device of the user, and a package updating unit for updating the package by modifying the data concerning the rewards included in the package by using the data concerning the rewards included in the modified package when a package update request is received from the user device. The user device includes a communication unit for communicating with the Server device, and a package update requesting unit for transmitting the package update request to the server device.

By making it possible to apply various types of operation such as the addition of rewards to the existing package, the above server device, user device, method for controlling a server device, recording medium, and system can enhance flexibility of a reward winning game and maintain a user's interest in the game.

BRIEF DESCRIPTION OF THE DRAWINGS

Other features and advantages of the present invention will be apparent from the ensuing description, taken in conjunction with the accompanying drawings, in which:

FIG. 3a is a diagram showing an example of a schematic configuration of the server;

FIGS. 3b to 3d are diagrams showing examples of the data structures of the various tables;

FIGS. 6a to 6k are diagrams showing an example of how the state of a package transitions;

FIG. 7 is a diagram showing an example of the sequence of operations performed in the game system;

DESCRIPTION

Hereinafter, with reference to the drawings, a server device, a user device, a method for controlling a server device, a recording medium, and a system will be described. It should be noted that the technical scope of the present invention is not limited to embodiments of the invention but covers the invention described in the claims and its equivalent.

In the present embodiment, the user plays a package-type reward winning game. Further, the user updates the package as needed. A portable device, in accordance with an instruction from the user, requests a server to give a reward, update the package, etc. In response to the request received from the portable device, the server performs processing for giving a reward, updating the package, etc.

The updating of the package is performed by applying a modified package to the package. The modified package defines a set of rewards and the type of operation ("addition", "deletion", or "replacement") to be applied to the existing package, and is classified as an addition package, a deletion package, or a replacement package according to the type of operation. The addition package is one that adds a reward to the existing package. The deletion package is one that deletes a reward from the existing package. The replacement package is one that replaces a reward included in the existing package by another reward.

The user can obtain such a modified package by various means. For example, the user can obtain it by playing a battle game. Further, the user can possess more than one modified package. The user can use the possessed modified package at any desired time. In this way, by making it possible to apply various types of operation such as the addition of rewards to the existing package by using such modified packages, the flexibility of the reward winning game can be enhanced.

Figure 1:
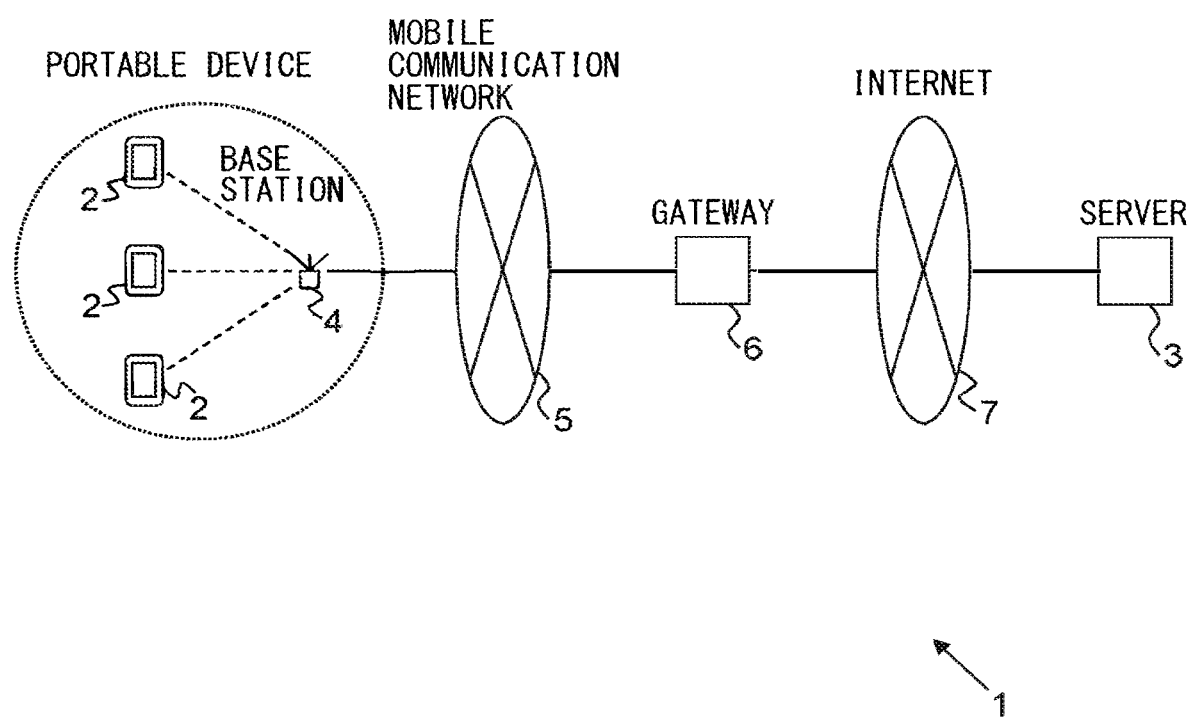
FIG. 1 is a diagram showing an example of a schematic configuration of a game system.

FIG. 1 is a diagram showing an example of a schematic configuration of a game system 1.

The game system 1 includes at least one portable device 2 and a server 3. The portable device 2 and the server 3 are interconnected via a communication network, for example, via a base station a mobile communication network 5, a gateway 6, and the Internet 7. A program (for example, a browsing program) executed on the portable device 2 and a program (for example, a game program) executed on the server 3 communicate with each other by using a communication protocol such as Hypertext Transfer Protocol (HTTP).

Figure 2:
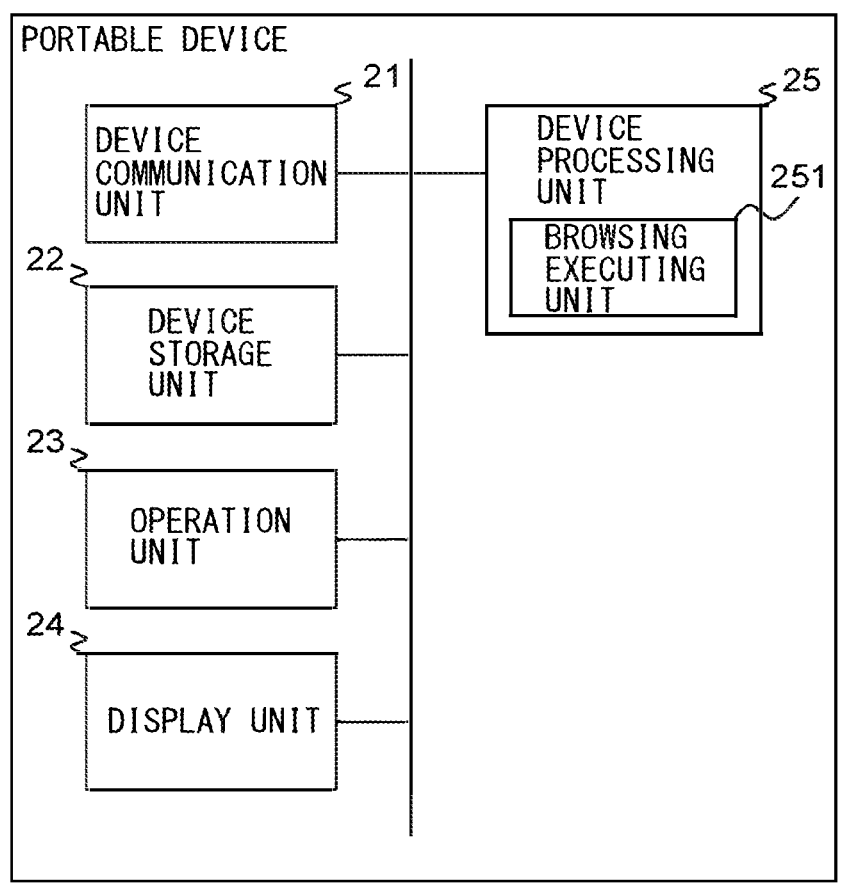
FIG. 2 is a diagram showing an example of a schematic configuration of the portable device.

FIG. 2 is a diagram showing an example of a schematic configuration of the portable device 2.

The portable device 2 is connected to the server 3 via the base station 4, the mobile communication network 5, the gateway 6, and the Internet 7, to communicate with the server 3. In accordance with an operation of an operation unit 23 (a button, etc.) by the user, the portable device 2 requests the server 3 to give a reward, update the package, etc. The portable device 2 receives display data concerning giving a reward, updating the package, etc., from the server 3, and displays the data. For this purpose, the portable device 2 includes a device communication unit 21, a device storage unit 22, the operation unit 23, a display unit 24, and a device processing unit 25.

In the present embodiment, the portable device 2 is assumed to be a multi-function mobile telephone ("smartphone"), but the present invention is not limited to this particular type of device. The portable device 2 may be, for example, an ordinary mobile phone ("feature phone"), a personal digital assistant (PDA), a portable game machine, a portable music player, a tablet PC, or the like, as long as the present invention can be applied thereto.

The device communication unit 21 includes a communication interface circuit which includes an antenna having sensitivity to a designated frequency band, and connects the portable device 2 to the wireless communication network. The device communication unit 21 establishes a wireless signal circuit with the base station 4 in accordance with a communication scheme such as CDMA (Code Division Multiple Access) by using a channel allocated by the base station 4, and communicates with the base station 4. Then, the device communication unit 21 transmits data supplied from the device processing unit 25 to the server 3, etc. Further, the device communication unit 21 supplies data received from the server 3, etc., to the device processing unit 25.

The device storage unit 22 includes at least one device selected, for example, from among a semiconductor memory, a magnetic disk device, and an optical disk device. The device storage unit 22 stores an operating system program, driver programs, application programs, data, etc., to be used for processing in the device processing unit 25. For example, the device storage unit 22 stores driver programs such as an input device driver program for controlling the operation unit 23 and an output device driver program for controlling, the display unit 24. Further the device storage unit 22 stores application programs such as a browsing program for retrieving and displaying display data concerning giving a reward, updating the package, etc. Furthermore, the device storage unit 22 stores data such as display data, video data, image data, etc., concerning giving a reward, updating the package, etc. The device storage unit 22 may further store temporary data associated with prescribed processing.

The operation unit 23 may be, for example, a touch pad, a keyboard, or any other suitable device that can operate the portable device 2. The user can input letters, numerals, etc., by using the operating unit 23. When operated by the user, the operation unit 23 generates a signal corresponding to the operation. The generated signal is supplied as a user instruction to the device processing unit 25.

The display unit 24 may be, for example, a liquid crystal display, an organic EL (Electro-Luminescence) display, or any other suitable device that can display video, images, etc. The display unit 24 displays video, images, etc., corresponding to the video data and the image data supplied from the device processing unit 25.

The device processing unit 25 includes one or more processors and their peripheral circuits. The device processing unit 25 centrally controls the entire operation of the portable device 2, and is, for example, a CPU ((Central Processing Unit). The device processing unit 25 controls the operation of the device communication unit 21, the display unit 24, etc., so that various kinds of process ng of the portable device 2 are performed in appropriate procedures in accordance with the programs stored in the device storage unit 22 and with the operation of the operation unit 23, etc. The device processing unit 25 executes processing based on the programs (the operating system program, driver programs, application programs, etc.) stored in the device storage unit 22. The device processing unit 25 can execute multiple programs (application programs, etc.) in parallel.

The device processing unit 25 includes at least a browsing executing unit 251. This unit is a functional module implemented by a program executed on the processor included in the device processing unit 25. Alternatively, this unit may be implemented as firmware in the portable device 2.

The browsing executing unit 251 retrieves and displays display data concerning giving a reward, updating the package, etc. That is, in response to an instruction from the user, the browsing executing unit 251 transmits a request to the server 3 via the device communication unit 21 to retrieve the display data concerning giving a reward, updating the package, etc. The browsing executing unit 251 receives the corresponding display data from the server 3 via the device communication unit 21. The browsing executing unit 251 creates drawing data based on the received display data. More specifically, the browsing executing unit 251 interprets the received display data to identify control data and content data, and creates the drawing data by laying out the identified content data in accordance with the identified control data. Then, the browsing executing unit 251 outputs the created drawing data to the display unit 24.

FIG. 3a is a diagram showing an example of a schematic configuration of the server 3.

In response to the request from the portable device 2, the server 3 performs processing for giving a reward, updating the package, etc. At the same time, the server 3 creates the display data concerning giving a reward, updating the package, etc., and transmits the display data to the portable device 2. For this purpose, the server 3 includes a server communication unit 31, a server storage unit 32, and a server processing unit 33.

The server communication unit 31 includes a communication interface circuit for connecting the server 3 to the Internet 7, and communicates with the Internet 7. Then, the server communication unit 31 supplies the data received from the portable device 2, etc., to the server processing unit 33. Further, the server communication unit 31 transmits the data. supplied from the server processing unit 33 to the portable device 2, etc.

The server storage unit 32 includes at least one device selected, for example, from among a magnetic tape device, a magnetic disk device, and an optical disk device. The serer storage unit 32 stores an operating system program, driver programs, application programs,, data, etc., to be used for processing in the server processing unit 33. For example, the server storage unit 32 stores application programs such as a game program for giving a reward, updating the package, etc., and for creating display data concerning the results. Furthermore, the server storage unit 32 stores data in the form of tables such as a user table (FIG. 3b) for managing the users, a reward table (FIG. 3c) for managing the rewards, and a modified package table (FIG. 3d) for managing the modified packages. The server storage unit 32 may further store temporary data associated with prescribed processing.

FIGS. 3b to 3d are diagrams showing examples of the data structures of the various tables.

FIG. 3b shows the user table for managing the users. The user table stores for each user such data as the identification number (ID) and name of the user, the filename of image data, the ID of the reward given to the user, the ID and giving status "not-yet-given", "given.", or "deleted") of each reward included in the package, and the ID of each modified package that the user possesses.

FIG. 3c shows the reward table for managing the rewards. The reward table stores for each reward such data as the ID and name of the reward and the filename of image data.

FIG. 3d shows the modified package table for managing the modified packages. The modified package table stores for each modified package such data as the ID and name of the modified package, the type of operation ("addition", "deletion", or "replacement") to be applied to the existing package, and the ID of the included reward (in the case of "addition" or "deletion") or the ID of the reward to be replaced and the ID of the replaced reward (in the case of "replacement").

The server processing unit 33 includes one or more processors and the peripheral circuits. The server processing unit 33 centrally controls the entire operation of the server 3, and is, for example, a CPU. The server processing unit 33 controls the operation of the server communication unit 31, etc., so that various kinds of processing of the server 3 are performed in appropriate procedures in accordance with the programs stored in the server storage unit 32, etc. The server processing unit 33 executes processing based on the programs (the operating system program, driver programs, application programs, etc.) stored in the server storage unit 32. The server processing unit 33 can execute multiple programs (application programs, etc.) in parallel.

FIGS. 4a to 4d and FIGS. 5a and 5b are diagrams showing examples of the display screens produced on the portable device 2 based on the display data created by the server 3.

Figure 4A:
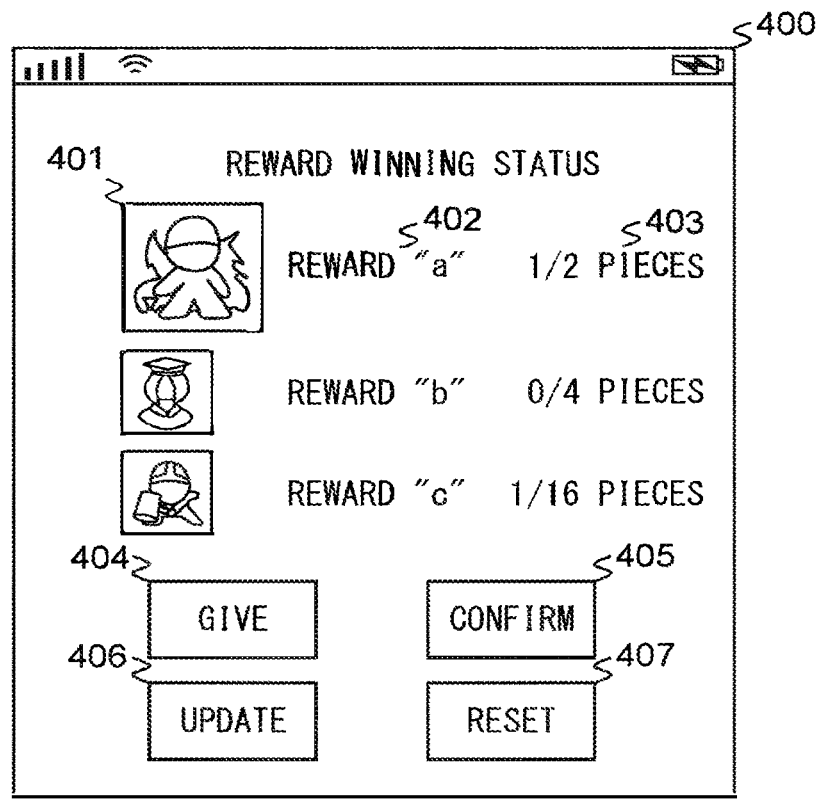
FIGS. 4a to 4d are diagrams showing examples of the display screens produced on the portable device.

FIG. 4a shows a home screen 400 which is displayed when the reward winning game is started. The home screen 400 is displayed based on the home screen display data received from the server 3. The screen displays the reward winning status which includes, for each reward, an image 401 and a name 402 of the reward and numbers (the number of pieces so far won versus the total number) 403. Buttons 404 to 407 are displayed at the bottom of the screen. A reward request, a package confirmation request, a modified package selection request, or a package reset request (for example, to reset the state from the state in which rewards are being given from the package back to the state before the rewards are given) is sent to the server 3 by depressing the "GIVE" button 404, the "CONFIRM" button 405, the "UPDATE" button 406, or the "RESET" button 407, respectively.

The image 401 of each reward may be sized differently according to the rarity of the reward or like criteria. For example, the higher the rarity of the reward, the larger the image of the reward may be made.

Figure 4B:
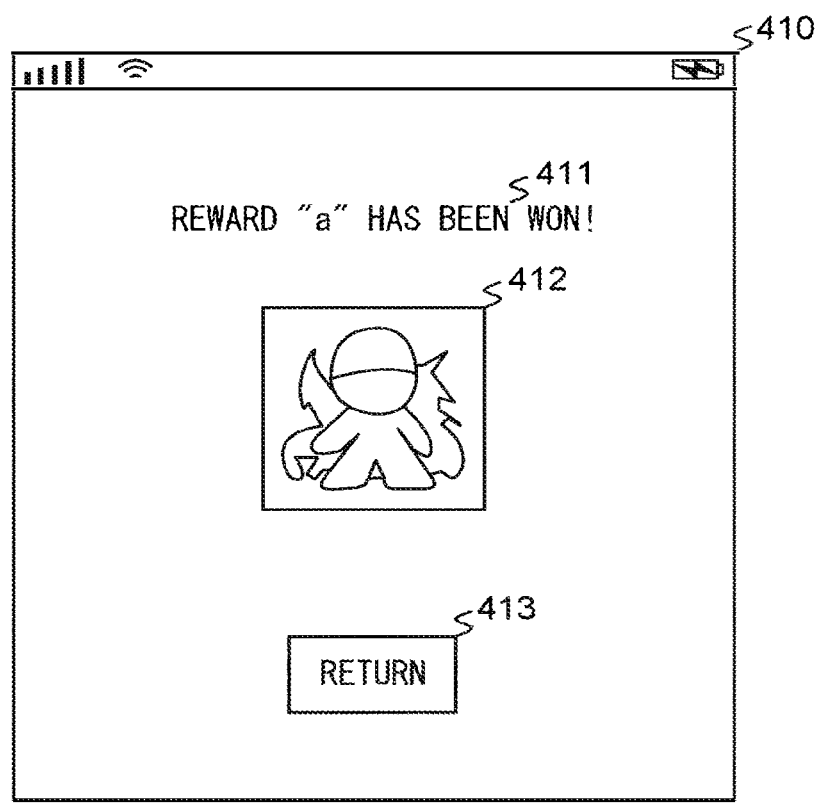

FIG. 4b shows a rewarding screen 410 which is displayed in response to the reward request entered from the home screen 400. The rewarding screen 410 is displayed based on the screen display data for giving reward received from the server 3. A text 411 to the effect that a reward has been won is displayed at the top of the screen, and an image 412 of the reward is displayed in the center of the screen. A "RETURN" button 413 is displayed at the bottom of the screen. By depressing the "RETURN" button 413, a request to return to the home screen 400 sent to the server 3 via the device communication unit 21.

Figure 4C:
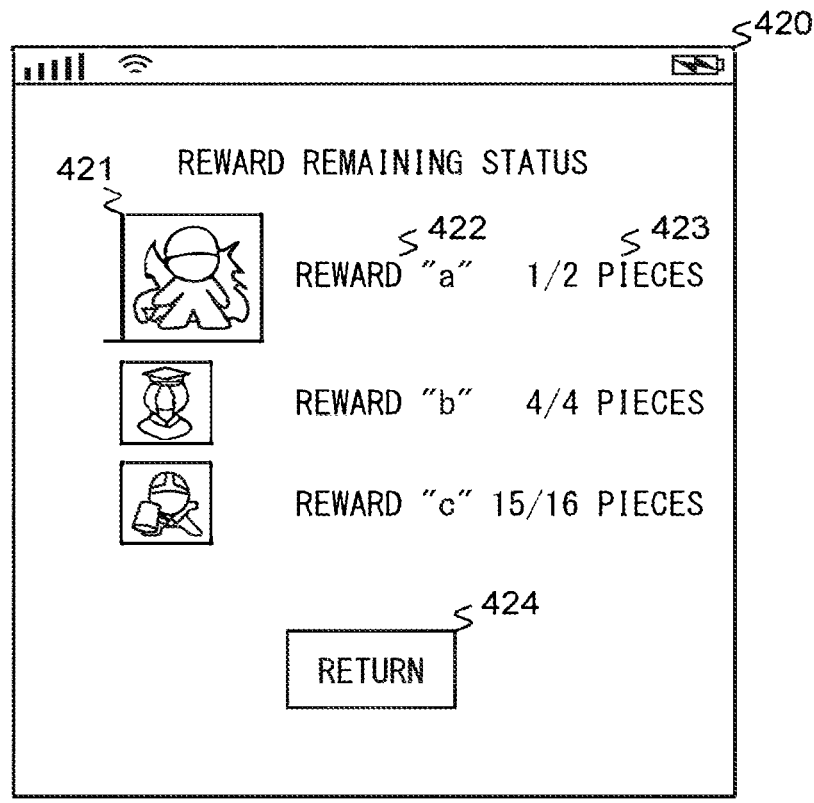

FIG. 4c shows a package confirmation screen 420 which is display in response to the package confirmation request entered from the home screen 400. The package confirmation screen 420 is displayed based on the screen display data for confirming package received from the server 3. The screen displays the reward remaining status which includes, for each reward, an image 421 and a name 422 of the reward and numbers (the number of remaining pieces versus the total number) 423. A "RETURN" button 424 is displayed at the bottom of the screen. By depressing the "RETURN" button 424, a request to return to the home screen 400 is sent to the server 3 via the device communication unit 21.

Figure 4D:
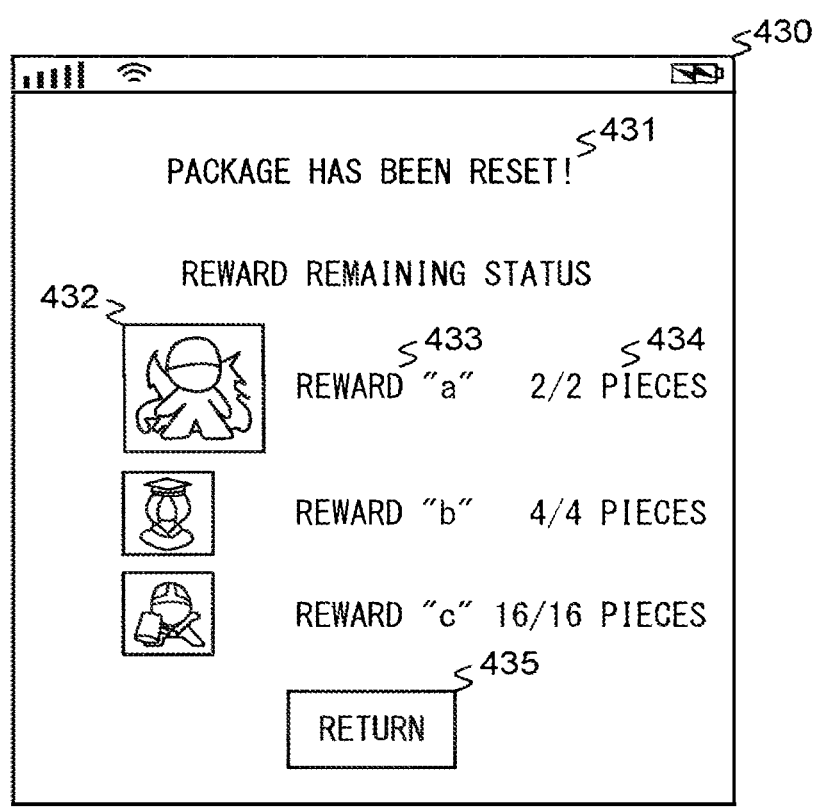

FIG. 4d shows a package resetting screen 430 which is displayed in response to the package reset request entered from the home screen 400. The package resetting screen 430 is displayed based on the screen display data for resetting package received from the server 3. A text 431 to the effect that the package has been reset is displayed at the top of the screen, and the reward remaining status which includes, for each reward, an image 432 and a name 433 of the reward and numbers (the number of remaining pieces versus the total number) 434 is displayed in the center of the screen. A "RETURN" button 435 is displayed at the bottom of the screen. By depressing the "RETURN" button 435, a request to return to the home screen 400 is sent to the server 3 via the device communication unit 21.

Instead of the reward remaining status, the reward winning status (the image and name of each reward, the numbers (the number of pieces so far won versus the total number), etc.) may be displayed on the package resetting screen 430.

Figure 5A:
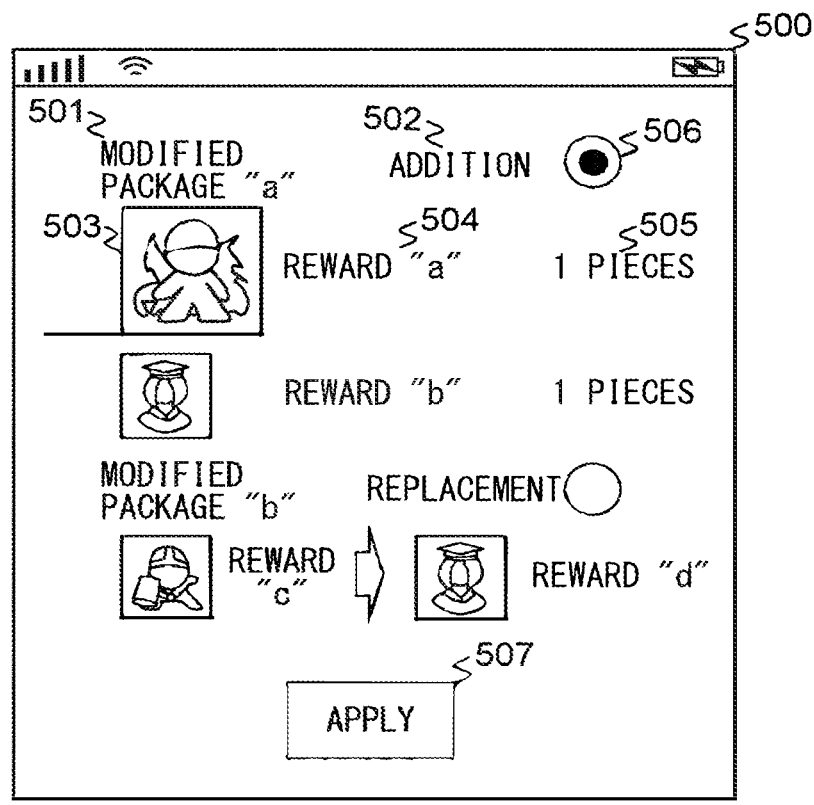
FIGS. 5a and 5b are diagrams showing other examples of the display screens produced on the portable device.

FIG. 5a shows a modified package selection screen 500 which is displayed in response to the modified package selection request entered from the home screen 400. The modified package selection screen 500 is displayed based on the screen display data for selecting modified package received from the server 3. The screen displays, for each modified package, a name 501 of the modified package, the type of operation 502 to be applied to the existing package, an image 503 and a name 504 of each included reward, the number of pieces 505, a radio button 506, etc. By depressing the radio button 506, the corresponding modified package is selected. An "APPLY" button 507 is displayed at the bottom of the screen. By depressing the "APPLY" button 507, a request to apply the selected modified package is sent to the server 3 via the device communication unit 21.

The modified packages may be displayed in order of rarity or other criteria. For example, modified packages with higher rarity scores may be displayed at higher positions on the screen. The rarity score or each modified package may be computed based on the rarity scores of the rewards included in it. For example, may be computed as the sum of the rarity scores of the rewards in the case of the addition package, as the reciprocal of the sum of the rarity scores of the rewards in the case of the deletion package, or as the sum of the rarity scores of replaced rewards in the case of the replacement package.

Figure 5B:
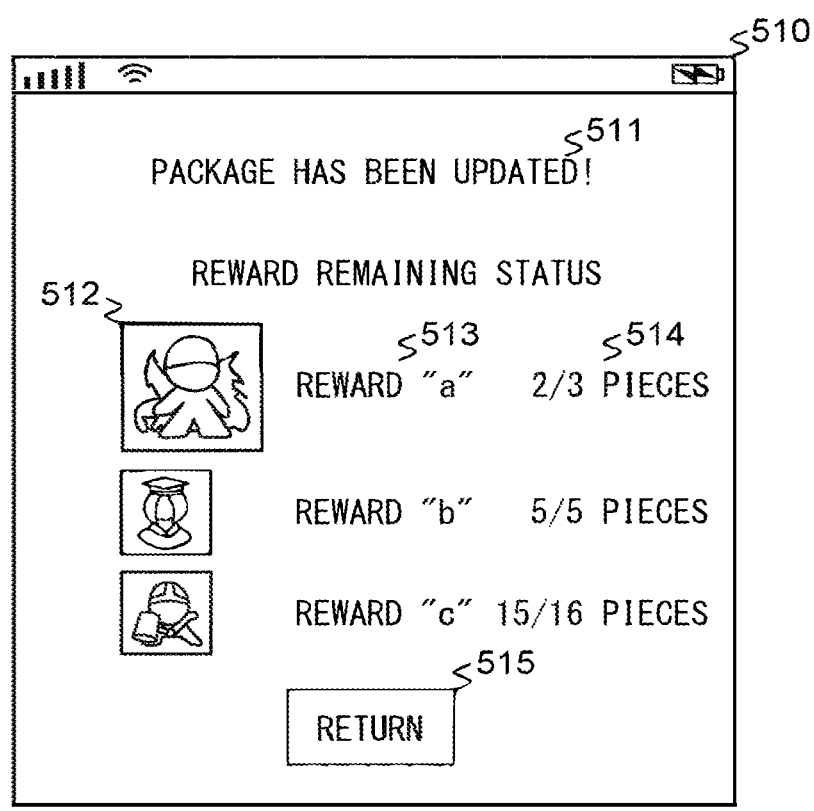

FIG. 5b shows a package updating screen 510 which is displayed upon application of the modified package selected from the modified package selection screen 500. The package updating screen 510 is displayed based on the screen display data for updating package received from the server 3. A text 511 to the effect that the package has been updated is displayed at the top of the screen, and the reward remaining status which includes, for each reward, an image 512 and a name 513 of the reward and numbers (the number of remaining pieces versus the total number) 514 is displayed in the center of the screen. A "RETURN" button 515 is displayed at the bottom of the screen. By depressing the "RETURN" button 515, a request to return to the home screen 400 is sent to the server 3 via the device communication unit 21.

Instead of the reward remaining status, the reward winning status (the image and name of each reward, the numbers (the number of pieces so far won versus the total number), etc.) may be displayed on the package updating screen 510.

FIGS. 6a to 6k are diagrams showing an example of how the state of a package transitions.

FIG. 6a shows the initial state of the package. The package includes rewards "a" to "h".

Suppose that a reward winning game was applied to this package (FIG. 6b) and the reward "c" was won. FIG. 6c shows the resulting state of the package. The reward "c" has been deleted from the package.

Next, suppose that a modified package (addition package) for adding rewards "i" and "j" was applied to the package (FIG. 6d). FIG. 6e shows the resulting state of the package. The rewards "i" and "j" have been added at the end of the package.

Next, suppose that a modified package (deletion package) for deleting the rewards "e" and "f" was applied to the package (FIG. 6f). FIG. 6g shows the resulting state of the package. The rewards "e" and "f" have been deleted from the package.

Next, suppose that a modified package (replacement package) for replacing the reward "h" by a reward "k" was applied to the package (FIG. 6h). FIG. 6i shows the resulting state of the package. The reward "h" included in the package has been replaced by the reward "k".

Lastly, suppose that a package resetting operation was applied to the package (FIG. 6j). FIG. 6k shows the resulting state of the package. The rewards "c", "e", and "f" that have been deleted as a result of the application of the reward winning game and the deletion package are now reinstated in the package. On the other hand, the rewards "i" and "j" added as a result of the application of the addition package and the reward k included by replacement as a result of the application of the replacement package are retained in the package.

However, the rewards added as a result of the application of the addition package or included by replacement as a result or the application of the replacement package may not be retained in the package. For example, the package may be reset to the initial state.

To implement the above-illustrated functions, the server processing unit 33 includes a control unit 331, a game starting unit 332, a game proceeding unit 333, a rewarding unit 334, a package confirming unit 335, a package updating unit 336, and a package resetting unit 337. These units are functional modules implemented by a program executed on the processor included in the server processing unit 33. Alternatively, these units may be implemented as firmware in the server 3.

The process performed by the control unit 331 will be described below. The control unit 331 controls the proceeding of the reward winning game, and instructs the game starting unit 332, the game proceeding unit 333, etc., to perform necessary processing.

When a user authentication request is received from the portable device 2 via the server communication unit 31, the control unit 331 interprets the received user authentication request and identifies the user ID and password. Then, by using the identified user ID and password as parameters, the control unit 331 instructs a user authenticating unit (not shown) to perform the necessary processing.

When the user has been authenticated by the user authenticating unit, the control unit 331 instructs the game starting unit 332 to execute the corresponding process by using the identified user ID as a parameter.

The control unit 331 transmits the home screen display data returned from the game starting unit 332, to the portable device 2 via the server communication unit 31.

On the other hand, when a game proceeding request is received from the portable device 2 via the server communication unit 31, the control unit 331 instructs the game proceeding unit 333 to execute the corresponding process by using the received game proceeding request as a parameter.

The control unit 331 transmits the screen display data for giving reward, etc., returned from the game proceeding unit 333, to the portable device 2 via the server communication unit 31.

The process performed by the game starting unit 332 will be described below. The game starting unit 332 tabulates the winning status of the rewards included in the package, and creates display data for the home screen that displays the results along with the buttons for accepting various instructions.

The game starting unit 332 creates the home screen display data. More specifically, the game starting unit 332 refers to the user table stored in the server storage unit 32 by using the received user ID as the key, and identifies the corresponding user. Further, the game starting unit 332 refers to the giving status of the rewards included in the identified user's package, and identifies "not-yet-given" and "given" rewards, respectively. Next, the game starting unit 332 refers to the reward table stored in the server storage unit 32 by using the ID of each identified reward as the key, and extracts the name of the corresponding reward and the filename of the associated image data. Then, the game starting unit 332 creates the home screen display data, including the received user ID, etc., for displaying the name of each identified reward, the image designated by its filename, the numbers (the number of pieces so far given versus the sum of the number of pieces so far given and the number of pieces not yet given), the buttons for accepting various instructions (rewarding, package confirmation, updating, and resetting), etc., in a prescribed layout.

The game starting unit 332 terminates the process after returning the created home screen display data to the control unit 331.

The process performed by the game proceeding unit 333 will be described below. The game proceeding unit 333 causes the reward winning game to proceed in accordance with game proceeding request.

The game proceeding unit 333 interprets the received game proceeding request and identifies the type of instruction and the user ID. If the type of instruction identified is the "rewarding", the game proceeding unit 333 instructs the rewarding unit 334 to execute the corresponding process by using the identified user ID as a parameter.

On the other hand, if the type of instruction identified is the "package confirmation", the game proceeding unit 333 instructs the package confirming unit 335 to execute the corresponding process by using the identified user ID as a parameter.

On the other hand, if the type of instruction identified is the "modified package selection", the game proceeding unit 333 instructs the package updating unit 336 to execute the corresponding process by using the type of instruction identified and the identified user ID as parameters.

On the other hand, if the type of instruction identified is the "modified package application", the game proceeding unit 333 interprets the received game proceeding request and identifies the modified package ID as well. Then, the game proceeding unit 333 instructs the package updating unit 336 to execute the corresponding process by using the type of instruction identified, the identified modified package ID, and the identified user ID as parameters.

On the other hand, if the type of instruction identified is the "package resetting", the game proceeding unit 333 instructs the package resetting unit 337 to execute the corresponding process by using the identified user ID as a parameter.

On the other hand, if the type of instruction identified is none of the above, i.e., if it is the "return to home screen", the game proceeding unit 333 instructs the game starting unit 332 to execute the corresponding process by using the identified user ID as a parameter.

The game starting unit 332 terminates the process after passing the screen display data for giving reward, etc., returned from the rewarding unit 334, etc., on to the control unit 331.

The process performed by the rewarding unit 334 will be described below. The rewarding unit 334 gives a reward selected from the package to the user, and creates display data for the rewarding screen that displays the result.

The rewarding unit 334 gives the reward to the user. More specifically, the rewarding unit 334 refers to the user-table stored in the server storage unit 32 by using the received user ID as the key, and identifies the corresponding user. Further, the rewarding unit 334 refers to the giving status of the rewards included in the identified user's package, and identifies "not-yet-given" rewards. Then, the rewarding unit 334 selects a reward from among the identified rewards by random lottery by using a pseudo-random number generated using the current time or the like as a seed. The rewarding unit 334 stores the ID of the selected reward as the ID of the reward given to the identified user. Further, the rewarding unit 334 changes the giving status of the selected reward to "given".

The rewarding unit 334 creates the screen display data for giving reward. More specifically, the rewarding unit 334 refers to the reward table stored in the server storage unit 32 by using the ID of the selected reward as the key, and extracts the name of the corresponding reward and the filename of the associated image data. Then, the rewarding unit 334 creates the screen display data for giving reward, including the received user ID, etc., for displaying the extracted name, the image designated by its filename, the text to the effect that the reward has been won, the button for accepting the "return to home screen" instruction, etc., in a prescribed layout.

The rewarding unit 334 terminates the process after returning the created screen display data for giving reward to the game proceeding unit 333.

The process performed by the package confirming unit 335 will be described below. The package confirming unit 335 tabulates the remaining status of the rewards included in the package, and creates display data for the package confirmation screen that displays the results.

The package confirming unit 335 creates the screen display data for confirming package. More specifically, the package confirming unit 335 refers to the user table stored in the server storage unit 32 by using the received user ID as the key, and identifies the corresponding user. Further, the package confirming unit 335 refers to the giving status of the rewards included in the identified user's package, and identifies "not-yet-given" and "given" rewards, respectively. Next, the package confirming unit 335 refers to the reward table stored in the server storage unit 32 by using the ID of each identified reward as the key, and extracts the name of the corresponding reward and the filename of the associated image data. Then, the package confirming unit 335 creates the screen display data for confirming package, including the received user ID, etc., for displaying the name of each identified reward, the image designated by its filename, the numbers (the number of pieces not yet given versus the sum of the number of pieces so far given and the number of pieces not yet given), the button for accepting the "return to home screen" instruction, etc., in a prescribed layout.

The package confirming unit 335 terminates the process after returning the created screen display data for confirming package to the game proceeding unit 333.

The process performed by the package updating unit 336 will be described below. The package updating unit 336 creates display data for the modified package selection screen that presents a list of available modified packages to the user and prompts the user to select a desired one from it. Further, the package updating unit 336 updates the package by using the selected modified package, tabulates the remaining status of the rewards included in the package, and creates display data for the package updating screen that displays the results.

If the type of instruction is the "modified package selection", the package updating unit 336 creates the screen display data for selecting modified package. More specifically, the package updating unit 336 refers to the user table stored in the server storage unit 32 by using the received user ID as the key, and identifies the corresponding user. Further, the package updating unit 336 extracts the ID of the modified package that the identified user possesses. The package updating unit 336 refers to the modified package table stored in the server storage unit 32 by using the extracted modified package ID as the key, and extracts the name of the corresponding modified package, the type of operation to be applied to the existing package, and the ID of each included reward. Next, the package updating unit 336 refers to the reward table stored in the server storage unit 32 by using the ID of each identified reward as the key, and extracts the name of the corresponding reward and the filename of the associated image data. Then, the package updating unit 336 creates the screen display data for selecting modified package, including the extracted modified package ID and the received user ID, etc., for displaying the name of the modified package identified by the extracted ID, the type of operation, the name of each reward, the image designated by its filename, the numbers, the radio button for accepting the modified package selection instruction, the button for accepting the selected modified package application instruction, etc., in a prescribed layout.

On the other hand, if the type of instruction is not the "modified package selection", that is, if it is the "modified package application", the package updating unit 336 applies the selected modified package to the package. More specifically, the package updating unit 336 refers to the modified package table stored in the server storage unit 32 by using the received modified package ID as the key, and identifies the corresponding modified package. Further, the package updating unit 336 extracts the type of operation to be applied to the existing package by the identified modified package. If the type of operation thus extracted is the "addition", the package updating unit 336 extracts the ID of each reward included in the identified modified package. Next, the package updating unit 336 refers to the user table stored in the server storage unit 32 by using the received user ID as the key, and identifies the corresponding user. Then, the package updating unit 336 stores the extracted reward ID as the ID of the reward included in the identified user's package. The package updating unit 336 sets the corresponding giving status to "not-yet-given".

On the other hand, if the type of operation is the "deletion", the package updating unit 336 extracts the ID of each reward included in the identified modified package. Next, the package updating unit 336 refers to the user table stored in the server storage unit 32 by using the received user ID as the key, and identifies the corresponding user. Further, the package updating unit 336 refers to the giving status of the rewards included in the identified user's package, and identifies "not-yet-given" rewards. Then, the package updating unit 336 matches the extracted reward ID against the IDs of the identified rewards, and changes the giving status of the first matching reward to "deleted".

On the other hand, if the type of operation is neither of the above, that is, if it is the "replacement", the package updating unit 336 extracts the ID of the reward to be replaced and the ID of the replaced reward included in the identified modified package. Next, the package updating unit 336 refers to the user table stored in the server storage unit 32 by using the received user ID as the key, and identifies the corresponding user. Further, the package updating unit 336 refers to the giving status of the rewards included in the identified user's package, and identifies "not-yet-given" rewards. Then, the package updating unit 336 matches the extracted ID of the reward to be replaced against the IDs of the identified rewards, and replaces the first matching reward ID by the replaced reward ID. The package updating unit 336 does not change the corresponding giving status.

The package updating unit 336 deletes the received modified package ID from the list of the IDs of the modified packages that the identified user possesses.

The package updating unit 336 creates the screen display data for updating package. More specifically, the package updating unit 336 refers to the giving status of the rewards included in the identified user's package, and identifies "not-yet-given" and "given" rewards, respectively. Next, the package updating unit 336 refers to the reward table stored in the server storage unit 32 by using the ID of each identified reward as the key, and extracts the name of the corresponding reward and the filename of the associated image data. Then, the package updating unit 336 creates the screen display data for updating package, including the received user ID, etc., for displaying the name of each identified reward, the image designated by its filename, the numbers (the number of pieces not yet given versus the sum of the number of pieces so far given and the number of pieces not yet given), the text to the effect that the package has been updated, the button for accepting the "return to home screen" instruction, etc., in a prescribed layout.

The package updating unit 336 may create screen display data for updating package for displaying the reward winning status, not the reward remaining status. In this case, the package updating unit 336 creates screen display data for updating package for displaying the numbers of rewards (the number of pieces so far given versus the sum of the number of pieces so far given and the number of pieces not yet given).

The package updating unit 336 terminates the process after returning the created screen display data for selecting modified package, etc., to the game proceeding unit 333.

The process performed by the package resetting unit 337 will be described below. The package resetting unit 337 resets the package, tabulates the rewards included in the package, and creates display data for the package resetting screen that displays the results.

The package resetting unit 337 resets the package. More specifically, the package resetting unit 337 refers to the user table stored in the server storage unit 32 by using the received user ID as the key, and identifies the corresponding user. Next, the package resetting unit 337 refers to the giving status of the rewards included in the identified user's package, and identifies "given" or "deleted" rewards. Then, the package resetting unit 337 changes the giving status of each identified reward to "not-yet-given".

The package resetting unit 337 creates the screen display data for resetting package. More specifically, the package resetting unit 337 identifies the rewards included in the identified user's package. Next, the package resetting unit 337 refers to the reward table stored in the server storage unit 32 by using the ID of each identified reward as the key, and extracts the name of the corresponding reward and the filename of the associated image data. Then, the package resetting unit 337 creates the screen display data for resetting package, including the received user ID, etc., for displaying the name of each identified reward, the image designated by its filename, the numbers (total number/total number), the text to the effect that the package has been reset, the button for accepting the "return to home screen" instruction, etc., in a prescribed layout.

The package resetting unit 337 may create screen display data for resetting package for displaying the reward winning status, not the reward remaining status. In this case, the package resetting unit 337 creates screen display data for resetting package for displaying the numbers of rewards (0/total number).

The package resetting unit 337 terminates the process after returning the created screen display data for resetting package to the game proceeding unit 333.

FIG. 7 shows an example of the sequence of operations performed in the came system 1. The sequence of operations hereinafter described is executed primarily by the device processing unit 25 and the server processing unit 33 by collaborating with the various component elements of the portable device 2 and the server 3 in accordance with the programs prestored in the device storage unit 22 and the server storage unit 32, respectively.

The user operates the operation unit 23 to instruct the device processing unit 25 to execute the browsing program. The device processing unit 25 starts the process based on the browsing program. More specifically, when the user ID and password are entered by the user operating the operation unit 23, the browsing executing unit 251, which is implemented by the browsing program, transmits a user authentication request including the entered user ID and password to the server 3 via the device communication unit 21 (step S700).

When the user authentication request is received from the portable device 2 via the server communication unit 31, the control unit 331 interprets the received user authentication request and identifies the user ID and password. Then, by using the identified user ID and password as parameters, the control unit 331 instructs the user authenticating unit (not shown) to perform the necessary processing (step S702).

When the user has been authenticated by the user authenticating unit, the control unit 331 instructs the game starting unit 332 to execute the corresponding process by using the identified user ID as a parameter (step S704).

Figure 8A:
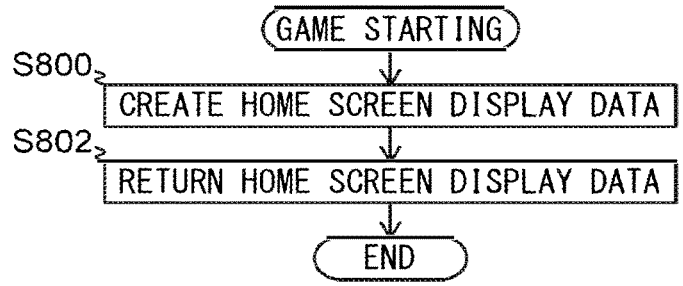
FIGS. 8a and 8b are diagrams showing an example of an operation flow of the server.

FIG. 8*a* is a diagram showing an example of an operation flow of the game starting unit 332.

The game starting unit 332 creates the home screen display data. (step S800).

The game starting unit 332 terminates the process after returning the created home screen display data to the control unit 331 (step S802).

Turning back to FIG. 7, the control unit 331 transmits the home screen display data returned from the game starting unit 332, to the portable device 2 via the server communication unit 31 (step S706).

When the home screen display data is received from the server 3 via the device communication unit 21, the browsing executing unit 251 creates drawing data based on the received home screen display data. The browsing executing unit 251 outputs the drawing data to the display unit 24 to display the home screen (step S708).

When an instruction such as "rewarding" is entered from the home screen by the user operating the operation unit 23, the browsing executing unit 251 transmits the game proceeding request including the type of instruction such as "rewarding" and the user ID included in the home screen display data, to the server 3 via the device communication unit 21 (step S710).

When the game proceeding request is received from the portable device 2 via the server communication unit 31, the control unit 331 instructs the game proceeding unit 333 to execute the corresponding process by using the received game proceeding request as a parameter (step S712).

Figure 8B:
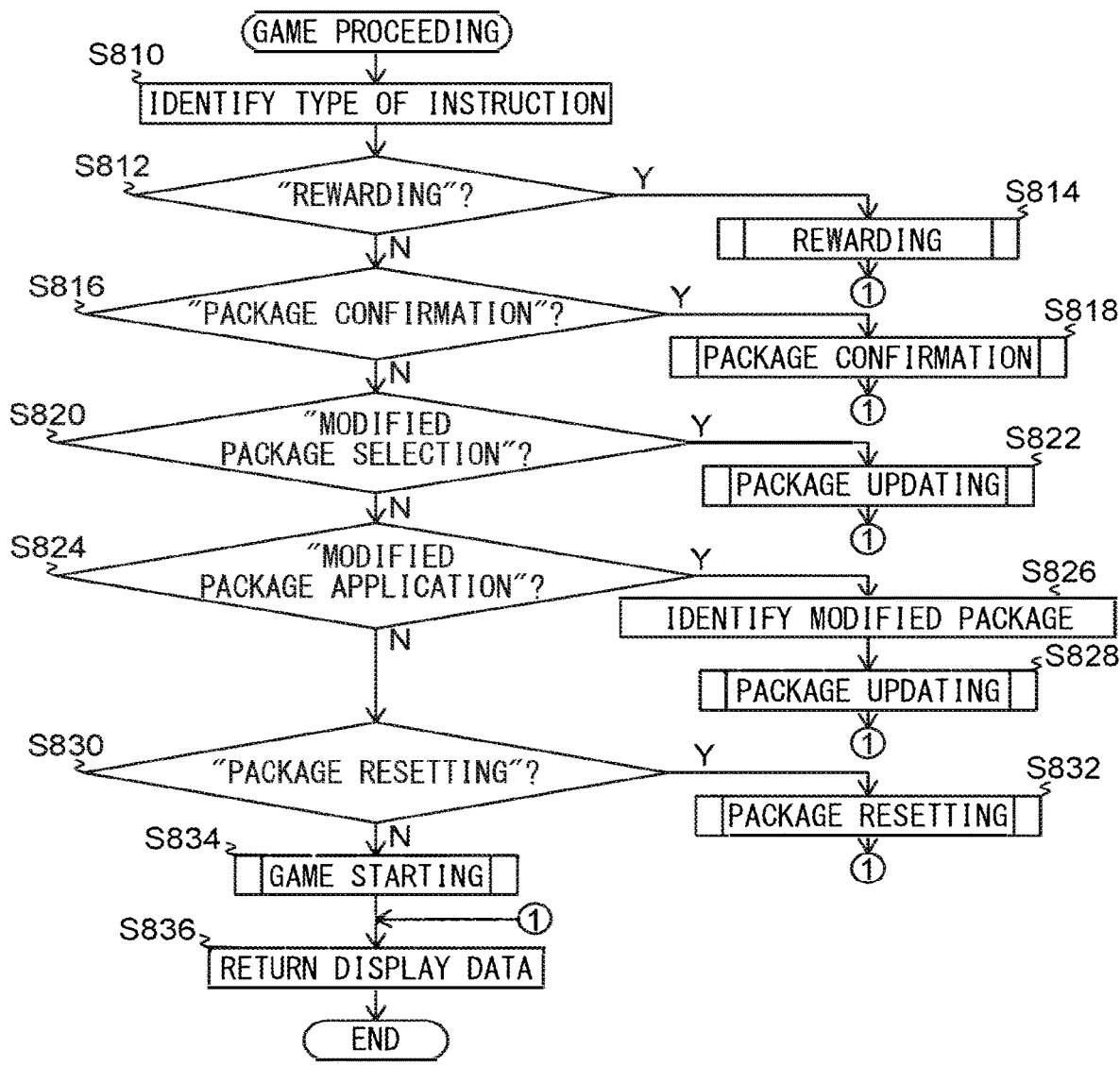

FIG. 8*b* is a diagram showing an example of an operation flow of the game proceeding unit 323.

The game proceeding unit 333 interprets the received game proceeding request and identifies the type of instruction (step S810).

If the type of instruction identified is the "rewarding" (Yes in step S812), the game proceeding unit 333 instructs the rewarding unit 334 to execute the corresponding process (step S814).

Figure 9A:
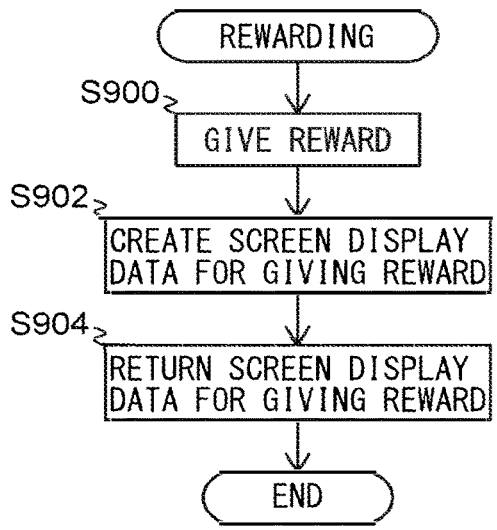
FIGS. 9a to 9d are diagrams showing another example of an operation flow of the server.

FIG. 9*a* is a diagram showing an example of an operation flow of the rewarding unit 334.

The rewarding unit 334 gives the reward to the user (step S900).

The rewarding unit 334 creates the screen display data for giving reward (step S902).

The rewarding unit 334 terminates the process after returning the created screen display data for giving reward to the came proceeding unit 333 (step S5904).

Turning back to FIG. 8*b*, if the type of instruction. identified is the "package confirmation" (No in step S812, and Yes in step S816), the game proceeding unit 333 instructs the package confirming unit 335 to execute the corresponding process (step S818).

Figure 9B:
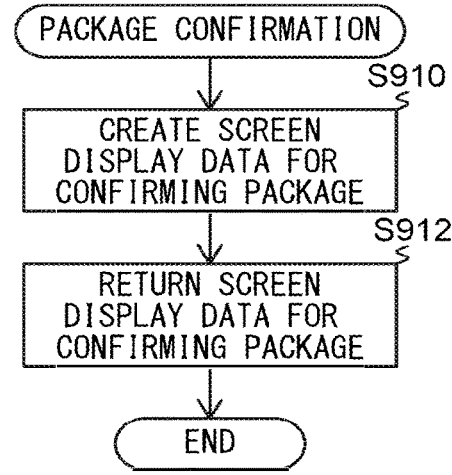

FIG. 9*b* is a diagram showing an example of an operation flow of the package confirming unit 335.

The package confirming unit 335 creates the screen display data for confirming package (step S910).

The package confirming unit 335 terminates the process after returning the created screen display data for confirming package to the game proceeding unit 333 (step S912).

Turning back to FIG. 8*b*, if the type of instruction identified is the "modified package selection" (No in step S816, and Yes in step S820), the game proceeding unit 333 instructs the package updating unit 336 to execute the corresponding process by using the type of instruction identified as parameters (step S822).

On the other hand, if the type of instruction identified is the "modified package application" (No in step S820, and Yes in step S824), the game proceeding unit 333 interprets the received game proceeding request, and identifies the modified package ID (step S826).

The game proceeding unit 333 instructs the package updating unit 336 to execute the corresponding process by using the type of instruction identified and the identified modified package ID as parameters (step S828).

Figure 9C:
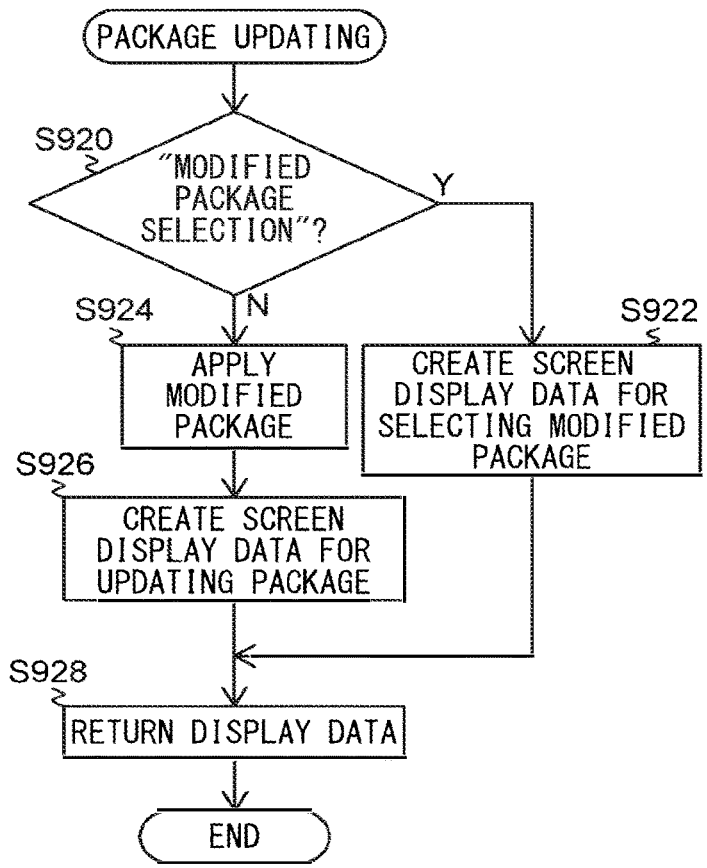

FIG. 9*c* is a diagram showing an example of an operation flow of the package updating unit 336.

If the type of instruction is the "modified package selection" (Yes in step S920), the package updating unit 336 creates the screen display data for selecting modified package (step S922).

On the other hand, if the type of instruction is not the "modified package selection" (No in step S920), the package updating unit 336 applies, to the package, the modified package corresponding to the received modified package ID (step S924).

The package updating unit 336 creates the screen display data for updating package (step S926).

The package updating unit 336 terminates the process after returning the created screen display data for selecting modified package, etc., to the game proceeding unit 333 (step S928).

Turning back to FIG. 8*b*, if the type of instruction identified is the "package resetting" (No in step S824, and Yes in step S830), the game proceeding unit 333 instructs the package resetting unit 337 to execute the corresponding process (step S832).

Figure 9D:
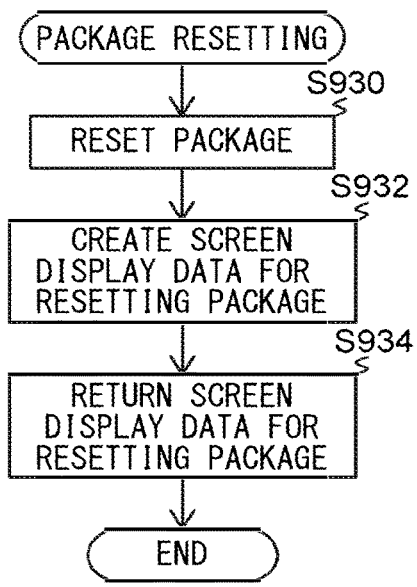

FIG. 9*d* is a diagram showing an example of an operation flow of the package resetting unit 337.

The package resetting unit 337 resets the package (step S930).

The package resetting unit 337 creates the screen display data for resetting package (step S932).

The package resetting unit 337 terminates the process after returning the created screen display data for resetting package to the game proceeding unit 333 (step S934).

Turning back to FIG. 8*b*, if the type of instruction identified is none of the above (No in step S830), the game proceeding unit 333 instructs the game starting unit 332 to execute the corresponding process (step S834).

The game starting unit 332 terminates the process after passing the screen display data for giving reward, etc., returned from the rewarding unit 334, etc., on to the control unit 331 (step S836).

Turning back to FIG. 3*b*, the control unit 331 transmits the screen display data for giving reward, etc., returned from the game proceeding unit 333, to the portable device 2 via the server communication unit 31 (step S714).

When the screen display data for giving reward, etc., are received from the server 3 via the device communication unit 21, the browsing executing unit 251 creates drawing data based on the received screen display data for giving reward, etc. The browsing executing unit 251 outputs the drawing data to the display unit 24 to display the rewarding screen, etc., (step S716).

As has been described above, by making it possible to apply various types of operation such as the addition of rewards to the existing package, the flexibility of the reward winning game can be enhanced, and this serves to maintain the user's interest in the game.

The present invention is not limited to the above specific embodiment. For example, in the above embodiment, it has been described that the modified package is obtained by playing a battle game, but the modified package may be obtained by other means. For example, it may be obtained by playing another reward winning game or clearing a mission (the so-called "quest") requested by a character (the so-called NPC (Non-Player Character)) operated by a computer, or by participating in an event (for example, a RAID battle) by organizing a team with other users. Further, packages with different rarity levels may be obtained according to the degree of difficulty of the quest, event, etc. For example, a package with a higher rarity level may be obtained as the degree of difficulty of the quest, event, etc., increases. Further, packages with different rarity levels may be obtained according to the number of user logins, the number of executions of the reward winning game, etc. For example, a package with a higher rarity level may be obtained as the number of user logins, the number of executions of the reward winning game, or the like increases.

Further, in the above embodiment, it has been described that there are three types of modified package, i.e., the addition package, the deletion package, and the replacement package, but only one or two of them may be made available. Furthermore, these packages may be combined into one package so that the various types of operation can be applied by using the one package.

A computer program for causing a computer to execute the respective functions of the device processing unit 25 and the server processing unit 33 may be provided in a form recorded on a computer readable recording medium such as a magnetic recording medium or an optical recording medium.

The preceding description has been presented only to illustrate and describe exemplary embodiments of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. An apparatus for providing an electronic game to a user device via a communication network, the apparatus comprising:

circuitry configured to:
      during execution of the electronic game provided to the user device by the apparatus via the communication network, update a data package that corresponds to a user participating in an event proceeding in the electronic game based on a modified package, the data package being associated with a plurality of game rewards, the modified package being associated with at least one game reward, the update being performed by adding the at least one game reward associated with the modified package to the data package, or deleting a game reward from the plurality of game rewards associated with the data package, and the modified package being granted to update the data package in accordance with a difficulty level of the event, such that a modified package that includes a higher rarity game reward is granted when the event is an event with a higher difficulty level;
      give at least one game reward from the updated data package to the user; and
      continue the execution of the electronic game provided to the user device by the apparatus via the communication network, using the updated data package.

2. The apparatus according to claim 1, wherein the circuitry is configured to
   select the modified package from among a group of modified packages which are determined according to an outcome of the event, and
   give the selected modified package to the user.

3. The apparatus according to claim 1, wherein the circuitry is configured to
   generate information for displaying at least a part of images of game rewards associated with the updated data package on the user device of the user, the images of the game rewards having different appearances according to rarity levels of the respective game rewards.

4. The apparatus according to claim 3, wherein the circuitry is configured to vary size of the images of the game rewards to be displayed on the user device, according to the rarity levels of the game rewards, respectively.

5. The apparatus according to claim 4, wherein the circuitry is configured to increase a size of a first image of a first game reward to be displayed on the user device, as the rarity level of the first game reward increases.

6. The apparatus according to claim 1,
   wherein the circuitry is further configured to generate second information for displaying a modified-package view of a plurality of modified packages on the user device,
   wherein the modified-package view includes images of the game rewards to be added to the updated data package, and
   wherein the circuitry is configured to update the data package according to the modified package selected by the user on the modified-package view.

7. The apparatus according to claim 1, wherein the circuitry is further configured to initialize reward giving-status information in association with the user to indicate that no game reward of the data package has been given to the user and no game reward of the modified package has been added to the updated data package in association with the user.

8. The apparatus according to claim 1, wherein the circuitry is configured to receive a request from the user, identify a type of instruction included in the request, and identify a user ID of the user, and execute a corresponding process by using the identified user ID as a parameter, in response to the type of instruction being identified as a reward request.

9. The apparatus according to claim 1, wherein the circuitry is configured to generate second information for displaying an image of the modified package.

10. A non-transitory computer-readable recording medium having recorded thereon a program for controlling an apparatus providing an electronic game to a user device via a communication network, the program causing the apparatus to execute a process, the process comprising:

during execution of the electronic game provided to the user device by the apparatus via the communication network, updating a data package that corresponds to a user participating in an event proceeding in the electronic game based on a modified package, the data package being associated with a plurality of game rewards, the modified package being associated with at least one game reward, the update being performed by adding the at least one game reward associated with the modified package to the data package, or deleting a game reward from the plurality of game rewards associated with the data package, and the modified package being granted to update the data package in accordance with a difficulty level of the event, such that a modified package that includes a higher rarity game reward is granted when the event is an event with a higher difficulty level;

giving at least one game reward from the updated data package to the user; and continuing the execution of the electronic game provided to the user device by the apparatus via the communication network, using the updated data package.

11. The non-transitory computer-readable recording medium according to claim 10, wherein the process comprises:

selecting the modified package from among a group of modified packages which are determined according to an outcome of the event, and giving the selected modified package to the user.

12. The non-transitory computer-readable recording medium according to claim 10, wherein the process comprises generating information for displaying at least a part of images of game rewards associated with the updated data package on the user device of the user, the images of the game rewards having different appearances according to rarity levels of the respective game rewards.

13. The non-transitory computer-readable recording medium according to claim 12, wherein the process comprises varying size of the images of the game rewards to be displayed on the user device, according to the rarity levels of the game rewards, respectively.

14. The non-transitory computer-readable recording medium according to claim 13, wherein the process comprises increasing a size of a first image of a first game reward to be displayed on the user device, as the rarity level of the first game reward increases.

15. The non-transitory computer-readable recording medium according to claim 10, wherein the process comprises generating second information for displaying a modified-package view of a plurality of modified packages on the user device, wherein the modified-package view includes images of the game rewards to be added to the updated data package, and wherein the process comprises updating the data package according to the modified package selected by the user on the modified-package view.

16. The non-transitory computer-readable recording medium according to claim 10, wherein the process comprises initializing reward giving-status information in association with the user to indicate that no game reward of the data package has been given to the user and no game reward of the modified package has been added to the updated data package in association with the user.

17. A method for controlling an apparatus providing an electronic game to a user device via a communication network, the method comprising:

during execution of the electronic game provided to the user device by the apparatus via the communication network, updating, by circuitry, a data package that corresponds to a user participating in an event proceeding in the electronic game based on a modified package, the data package being associated with a plurality of game rewards, the modified package being associated with at least one game reward, the update being performed by adding the at least one game reward associated with the modified package to the data package, or deleting a game reward from the plurality of game rewards associated with the data package, and the modified package being granted to update the data package in accordance with a difficulty level of the event, such that a modified package that includes a higher rarity game reward is granted when the event is an event with a higher difficulty level;

giving, by the circuitry, at least one game reward from the updated data package to the user; and continuing, by the circuitry, the execution of the electronic game provided to the user device by the apparatus via the communication network, using the updated data package.

18. The method according to claim 17, further comprising:

selecting the modified package from among a group of modified packages which are determined according to an outcome of the event, and giving the selected modified package to the user.

19. The method according to claim 17, further comprising generating information for displaying at least a part of images of game rewards associated with the updated data package on the user device of the user, the images of the game rewards having different appearances according to rarity levels of the respective game rewards.

20. The method according to claim 19, further comprising varying size of the images of the game rewards to be displayed on the user device, according to the rarity levels of the game rewards, respectively.

* * * * *